Oct. 31, 1967   W. B. CAGLE ET AL   3,350,692
FAST REGISTER CONTROL CIRCUIT
Filed July 6, 1964   20 Sheets-Sheet 1

INVENTORS  W. B. CAGLE
R. S. MENNE
BY John C. Allnerat
ATTORNEY

Oct. 31, 1967  W. B. CAGLE ET AL  3,350,692
FAST REGISTER CONTROL CIRCUIT
Filed July 6, 1964
20 Sheets-Sheet 2

LIMITS OF ABBREVIATED ROTATE MODE

LIMITS OF ABBREVIATED ROTATE MODE

Oct. 31, 1967
W. B. CAGLE ET AL
3,350,692
FAST REGISTER CONTROL CIRCUIT
Filed July 6, 1964
20 Sheets-Sheet 19
FIG. 22
| FIG.6  | FIG.7  | FIG.8  | FIG.9  |
|--------|--------|--------|--------|
| FIG.10 | FIG.11 | FIG.12 | FIG.13 |
| FIG.14 | FIG.15 | FIG.16 | FIG.17 |
| FIG.18 | FIG.19 | FIG.20 | FIG.21 |
FIG. 23A
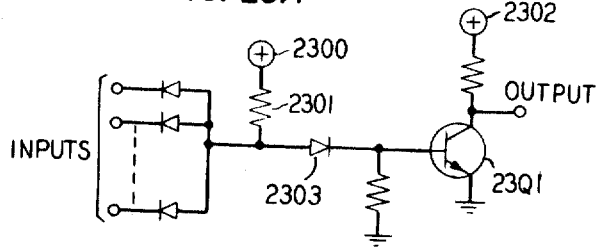
FIG. 23B
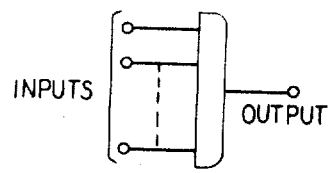
FIG. 23C
| $I_1$ | $I_2$ | OUTPUT |
|-------|-------|--------|
| 0 | 0 | 1 |
| 0 | 1 | 1 |
| 1 | 0 | 1 |
| 1 | 1 | 0 |
FIG. 24
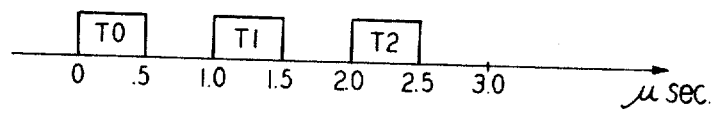

Oct. 31, 1967    W. B. CAGLE ET AL    3,350,692
FAST REGISTER CONTROL CIRCUIT
Filed July 6, 1964    20 Sheets-Sheet 20
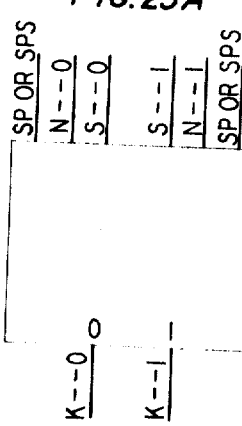
FIG.25A
FIG.25B
| PRESENT STATE | K--0 | K--1 |
|---|---|---|
| 0 | HIGH | LOW |
| 1 | LOW | HIGH |
FIG.25C
| TO WRITE | N--0 | N--1 |
|---|---|---|
| 0 | HIGH | LOW |
| 1 | LOW | HIGH |
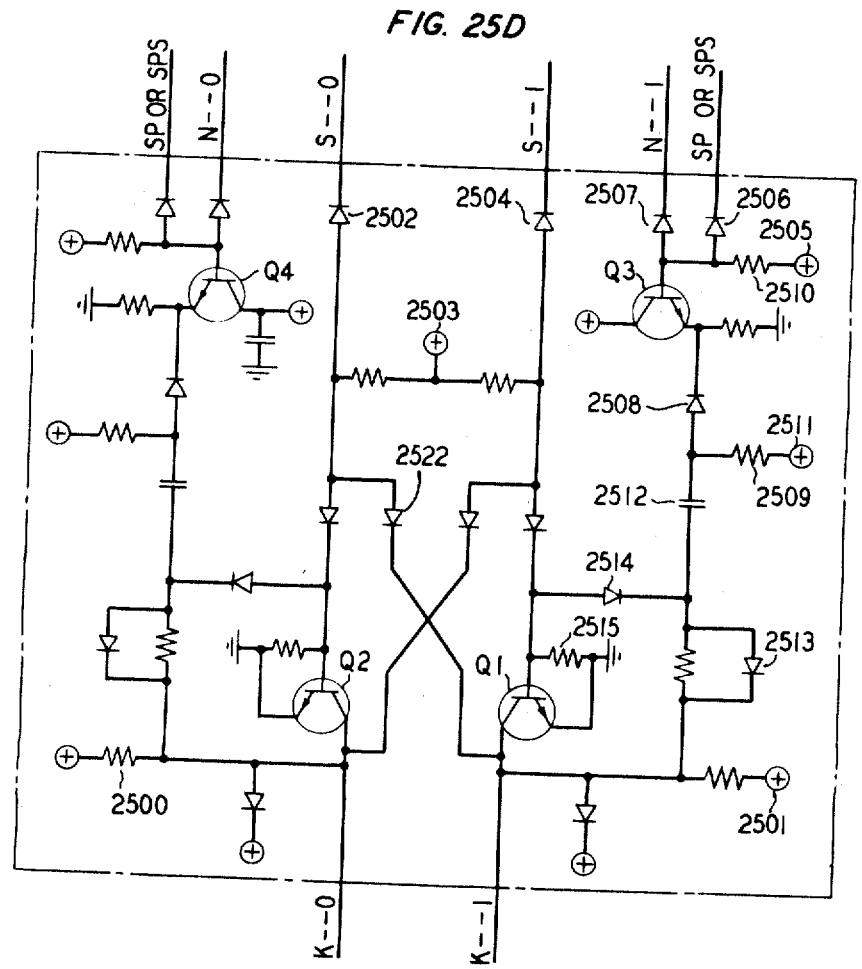
FIG. 25D

United States Patent Office 3,350,692
Patented Oct. 31, 1967

3,350,692
FAST REGISTER CONTROL CIRCUIT
William B. Cagle, Colts Neck, and Robert S. Menne,
Little Silver, N.J., assignors to Bell Telephone Laboratories, Incorporated, New York, N.Y., a corporation
of New York
Filed July 6, 1964, Ser. No. 380,274
15 Claims. (Cl. 340—172.5)

ABSTRACT OF THE DISCLOSURE

A shift and rotate circuit which performs a specified shift or rotate operation of from 1 to 24 places on data stored in the binary cell stages of a register by a selected sequence of three multi-place shifts of 1, 4, 7 or 8 places. A first logic stage is employed to translate control information defining the nature, direction and magnitude of a desired shift or rotate operation in combination with the data in the register to define the destinations of specific bits of that data. The output of the first logic stage is combined with selected clock pulses by a second logic stage to gate the data into appropriate stages of the register.

---

This invention relates to data processing systems, and more particularly to circuits for controlling the rapid shifting and rotating of bits in a multistage data register.

Shift and rotate circuits are commonly found not only in general-purpose digital computers but in special-purpose digital systems as well. A data register is provided, each stage of which represents a numerical value, most often one of the two binary values. Rotation of the bits in the register entails the displacement of all digits by a specific amount, to either the left or the right. The digits, or bits in a binary system, are reinserted at the right end after they have passed out of the left end of the register, when the rotation is to the left, and are reinserted at the left end of the register after they have passed out of the right end in the case of a right rotation. Shifting is also a displacement to either the left or the right, but a 0 is inserted in each of the vacated spaces at either end.

A major disadvantage of present-day shift and rotate circuits is their low speed. An individual shift pulse is usually required for every position the bits are to be shifted. Each shift pulse causes the bit in each stage to be transferred to the stage immediately to the right or the left. If for example the register contains 23 stages, numbered 0–22, to shift or rotate the word in the register a maximum number of positions 23 shift pulses are required. (The register would then contain 23 0's if a shift order was executed, or would remain unchanged if a rotate order was executed.) If shift pulses of 0.5 microsecond duration are applied once each microsecond, the execution of a maximum shift or rotate order on a 23-stage register would require 23 microseconds. The excessive time required for shifting or rotating may seriously affect the efficiency of a system. In many computers only one type of order may be executed at any time. Thus once a shift or rotate order is given all other actions cease until after the order is carried out. In many machines the time required for a shift or rotate order is in excess of a machine cycle, in which case two or more cycles are required to execute a single shift or rotate order. The situation is further aggravated in the many systems where the same period is provided for a shift or rotate order independent of the number of positions which the bits are to be shifted. If the time allowed for the execution of the order is always that required to shift the maximum number of positions, a highly inefficient operation may result. For example if the bits need be shifted only one position in a 23-stage register, the period allowed to execute the order may be 23 times that required to actually carry it out. It would therefore be highly advantageous to be able to shift or rotate the maximum number of positions in a very short time.

In addition to rotating and shifting the bits in a register in either direction, in some systems it is advantageous to provide an "abbreviated rotate" operation. A series of stages within the register is selected, and the bits in these stages may be rotated in either direction. Thus if stages 6–21 are selected, when an abbreviated rotate order to the right is executed the bit in stage 6 is inserted into stage 21, and the bits in each of stages 7–21 are shifted one position to the right. The bits in all stages of the register other than 6–21 remain undisturbed.

It is a general object of this invention to provide a high-speed and otherwise improved register control circuit for controlling the execution of shift, rotate, and abbreviated rotate orders in either direction.

In the prior art the magnitude of the shift is generally determined by the number of shift pulses applied. Consequently, the shifting time is determined to a great extent by the repetition rate of the shift pulses, which in turn is a function of the time required for one bit to be transferred to the adjacent stage. In our invention, however, a completely different approach is taken to control the various shifting operations. Each stage of the 23-stage register in the illustrative embodiment of the invention is connected through respective gating paths to the stages 1, 4, 7 and 8 stages away, to both the right and the left. Shifting or rotating takes place in at most three steps. For example, suppose it is necessary to rotate the bits 19 positions to the right. When a first clock pulse (equivalent to the prior art shift pulse) is applied, all gates which connect a stage of the register to another stage seven positions to the right operate. If the register has 23 stages, 23 gates are operated at this time. The gates from the rightmost lower-numbered stages of the register go to the stages at the leftmost end of the register. The register may be thought of as a wheel with the last stage following the first (or vice versa depending on the direction of rotation). Thus the gate connecting the third stage to the stage seven positions away to the right would terminate at the nineteenth stage. If a shift rather than a rotate order is executed all gates going from the rightmost stages to the leftmost stages are not operated. In either event the bits of the register which are to be written into other stages are each effectively shifted seven positions when the first clock pulse is applied.

A second clock pulse operates each gate connecting a stage of the register to another stage eight positions away to the right. Thus in the second step of the operation all bits are moved directly eight positions to the right. Finally, when a third clock pulse is applied each gate connecting a stage of the register to another stage four positions away to the right is operated, and the various bits are moved directly four positions to the right. In sum, each of the bits has been rotated 7, 8 and 4 positions to the right, or a total of 19 positions. The entire word in the register is thus rotated 19 positions to the right in only three steps, rather than 19. The operation is the same whether rotating or shifting to the right, except that in shifting operations the gates connecting the rightmost stages to the leftmost stages are not operated, and instead 0's are inserted in the leftmost stages. In a similar manner the gates connecting each stage of the register to the stages 1, 4, 7 and 8 positions to the left are used during shift and rotate operations to the left. In all cases, the word in the register is shifted the desired number of positions in at most three steps. It will be recognized that to implement the principles of the invention it is required to utilize a considerable number of gating circuits. However, the reduction in time required to execute an order more than outweighs the increased cost of the equipment.

Additional paths are required for implementing the abbreviated rotate operation. Stages 6–21 of stages 0–22 are used when the circuit functions in the abbreviated rotate mode. Accordingly stage 7, for example, must be directly coupled on the right to stages 6, 19, 16, and 15, the stages which are respectively 1, 4, 7, and 8 positions to the right of stage 7 within the abbreviated rotate range. Similar remarks apply to all of the rightmost and leftmost stages within the group 6–21.

Some of the gating paths just described need not be provided due to a certain amount of duplication inherent in the scheme. For example, stage 10 must be connected by a respective gating path to the stage 8 positions to its left, stage 18. To accomplish the abbreviated rotate operation to the right stage 10 must be connected to the four stages 1, 4, 7, and 8 positions to its right within the group 6–21. Stage 10 must thus be connected by a gating path directly to stage 18, the stage 8 positions to the right of stage 10 when the circuit is operating in the abbreviated rotate mode. Thus stage 10 requires a gating path to stage 18 for both left shift, rotate, and abbreviated rotate steps of 8 positions, and right abbreviated rotate steps of 8 positions. Rather than to provide two gating paths it is possible to provide only one, which one path controls the transfer of the bit in stage 10 to stage 18 whenever a step of 8 positions to the left on any order, or 8 positions to the right on an abbreviated rotate order, is required.

Thus depending on the particular types of operations to be executed in any system various gating functions may be combined and redundancy avoided. In designing a system utilizing the principles of the invention the various gating actions may be defined by a set of Boolean equations. The implementation of the circuitry is based on these equations, and redundancy may be avoided by resorting to known techniques for simplifying the implementation of a set of switching operations defined by a series of Boolean functions. The logic circuitry for controlling the various shifting and rotating operations has two types of inputs and one type of output. The first type of input is from the register stages themselves, namely, the state (1 or 0) of each stage. The second type of input information specifies the order to be executed—the number of positions which the bits are to be shifted, the mode of operation, i.e., shift, rotate or abbreviated rotate, and the direction of shift, i.e., right or left. The outputs include a plurality of conductors extended to respective stages of the register for the purpose of writing bit information directly into the register. The logic circuit accepts the input information which may, for example, indicate a shift to the right of 13 positions. The logic circuit then determines the descrete steps to be taken. For any order where the bits are to be shifted 13 positions shifting takes place in jumps of 1, 8 and 4 positions. When a first clock clock pulse is applied, all bits are shifted 1 position to the right. When the second and third clock pulses are applied, all bits are shifted directly to the right 8 and 4 positions respectively. If the order executed is a shift in either direction 0's are written into the stages at one end. If the order is to rotate bits are shifted from stages at one end to stages at the other.

If the order is to rotate in the abbreviated mode the bits are rotated as if the register comprised only stages 6–21.

In the illustrative embodiment of the invention the shifting takes place in discrete jumps of 1, 4, 7 and 8 positions. (Any of the numbers 1–23 may be formed by three of these numbers. For example, 18=7+7+4.) Numerous other possibilities exist; for example, it may be decided in a particular application to shift by jumps of 1, 2, 4, 8, 16, etc. positions, in which case the shifting operations would closely follow the binary code identifying the number of positions the register word is to be shifted. While any order may be executed in the illustrative embodiment of the invention in at most three steps it is possible to design a system in which an order would be executed in at most two steps, or even one step. For example, it is possible to connect each stage of a register through a respective gate to every other stage in the register. The logic circuit would interpret each order, and for a 23-stage register, would operate the 23 gates which connect each stage to the particular stage to which the bit in the former stage is to be transferred. While the speed of the circuit can thus be increased the control circuit is of course more complex due to the increased number of gates required. In any given application a balance must be reached. An increase in speed will generally result in an increase of circuitry. The final design depends upon such factors as the use foreseen for a shift order in the particular system, the cost of the total system as compared with that of the shift-rotate control circuitry, etc.

It is a feature of this invention to provide a plurality of gating paths for connecting each stage of a data register to other stages predetermined numbers of positions away.

It is another feature of this invention to translate an order to shift or rotate the word in the register a given number of positions into a series of numerical steps, the sum of which equals the given number.

It is another feature of this invention to shift the bits in the register in parallel, and in a series of jumps, each jump being equal to one of the numbers in the numerical series.

Further objects, features and advantages of the invention will become apparent upon consideration of the following description in conjunction wtih the drawing, in which.

FIGS. 6–21 disclose an illustrative embodiment of the invention;

FIG. 22 shows the arrangement of FIGS. 6–21;

FIGS. 23A–23C disclose the details and the manner of operation of the gate circuit utilized in the illustrative embodiment of the invention;

FIG. 24 shows the timing of the clock pulses which control the operations of the various gates in FIGS. 6–21; and FIGS. 25A–25D disclose the details and the manner of operation of one of the register stages used in the illustrative embodiment of the invention.

*Prior art*

Figure 1:
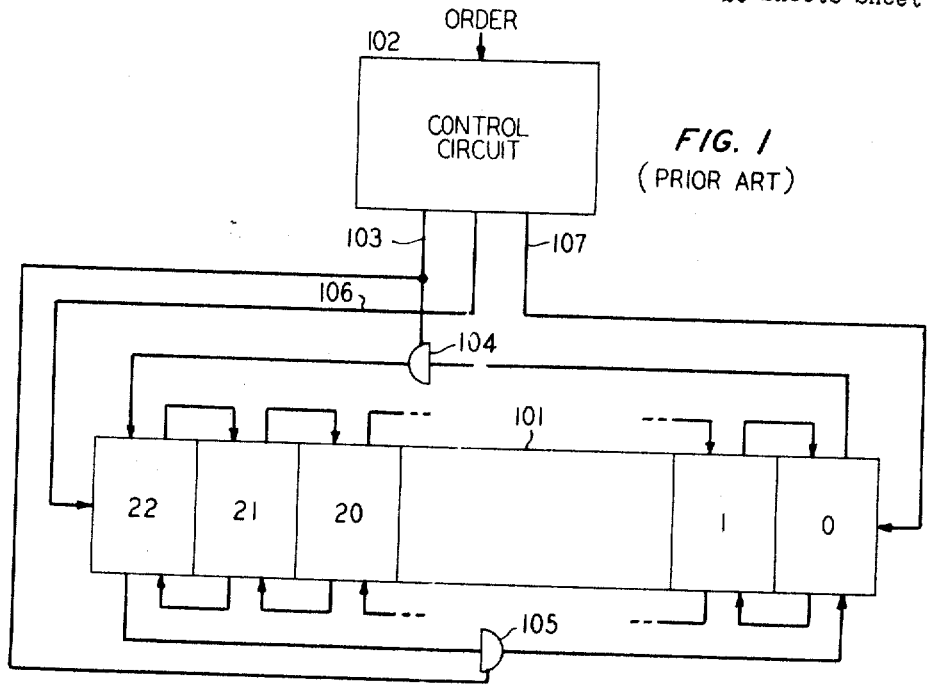
FIG. 1 is a block diagram of a prior art shift register system.

FIG. 1 discloses a typical prior art circuit. Register 101 comprises 23 stages, 0–22. A writing circuit, not shown, controls the initial writing of a word in the register. An order is sent to control circuit 102, the order including the type of operation to be performed (shift or rotate), the direction of the shifting, and its magnitude. (Throughout this description the terms shift and shifting are used generically, that is, they include both shift and rotate operations. The terms shift and shifting are also used to identify a shift operation as distinguished from a rotate operation, but it will be obvious when the terms are used in their generic sense as distinguished from their more restricted meaning.) Control circuit 102 applies a potential on conductor 103 to enable gates 104 and 105 only if the word in the register is to be rotated. The potential remains on conductor 103 throughout the duration of application of shift pulses to conductor 106 or 107. Shift pulses are applied to conductor 106 if the shifting or rotating is to the right, and shift pulses are applied to conductor 107 if it is to the left. In either case the number of shift pulses applied is equal to the number of positions the word in the register is to be shifted.

When each shift pulse is applied the bit in each stage is shifted to the stage adjacent to it. Shifts to the right are shown symbolically by the arrows at the top of the register connecting each stage to the adjacent stage to the right. Similarly, shifts to the left are shown by the arrows at the bottom of the register. In the case of rotation to the right, gate 104 is enabled, and each shift pulse on conductor 106 causes the bit in stage 0 to be written into stage 22. Similarly, when the register word is rotated to the left, gate 105 is enabled, and each shift pulse on conductor 107 causes the bit in stage 22 to be written into stage 0. In the event of a shift order, rather than a rotate order, a bit is not written into stage 0 or stage 22 because gate 104 or 105 is not enabled. A 0 is automatically inserted in stage 0 each time a shift pulse appears on conductor 107, or in stage 22 each time a shift pulse appears on conductor 106.

It is to be noted that in both shift and rotate operations an individual shift pulse is required for each position the register word is shifted. A maximum of 23 shift pulses are required to shift the entire word (leaving the register contents unchanged in the case of rotation, and all 0's in the case of a shift). The speed of the circuit is determined primarily by the time required to shift each bit from one stage to the next. If this time is in the order of 1 microsecond, a maximum of 23 microseconds may be required to execute a particular order.

Figure 2:
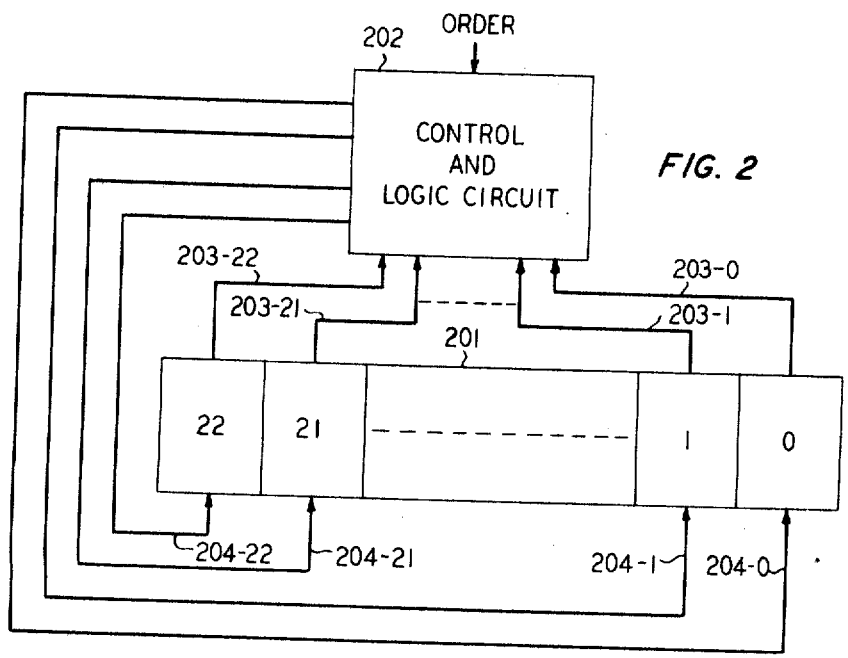
FIG. 2 is a block diagram of the invention which highlights the different approaches taken in the prior art and the invention.

*Block diagram of the invention—FIG. 2*

In FIG. 2 register 201 is similar to register 101 in FIG. 1. Control and Logic Circuit 202 however is considerably more complex than control circuit 102 in FIG. 1. Shift pulses are no longer applied at either end of the register. Instead, each stage is connected to Control and Logic Circuit 202 by one of respective conductors 203-0 through 203-22. Control and Logic Circuit 202 is in turn connected to each stage of the register by a respective one of conductors 204-0 through 204-22. The bits in all stages are transmitted in parallel to the Control and Logic Circuit on conductors 203-, and the bits to be written into all stages are transmitted in parallel from the Control and Logic Circuit along conductors 204-.

The order given to the Control and Logic Circuit again includes the type of operation (shift or rotate), the direction of the shift, and its magnitude. The Control and Logic Circuit is designed to effect the entire shift in at most three steps in the illustrative embodiment of the invention. Bits are read out in parallel from the stages, and transferred in parallel to other stages. In the case of rotate orders, in each step bits are read out of all 23 stages and written into all 23 stages. In the case of abbreviated rotate orders bits are read out of all of stages 6–21 and written into all of these same stages. In the case of shift orders 0's are written into the stages at one of the ends of the register independent of the contents of the respective stages which would ordinarily determine the bits to be written in these end stages.

The important thing to note in FIG. 2 is that the Control and Logic Circuit 202 does considerably more than does the Control Circuit 102 in the prior art circuit of FIG. 1. In FIG. 2 the Control and Logic Circuit reads information from each of the register stages, determines the stage into which each bit is to be written, and writes the bit in this stage. The complexity of the Control and Logic Circuit, as described above, depends inter alia upon the number of jumps which comprise the execution of each order. In the illustrative embodiment of the invention three spurts are required. In other applications the circuit may be designed to shift or rotate the entire word in only one jump, the bit in each stage being directed to that stage determined by the initial order. In the design of any system a balance must be reached between the decreased time required to execute an order and the increased complexity of the Control and Logic Circuit. By utilizing the principles of the invention a circuit may be designed wherein an individual shift pulse is not required for each position the register word is to be shifted, and instead the initial order is interpreted to control the shifting or rotation in discrete jumps in a considerably reduced time.

Figure 3:
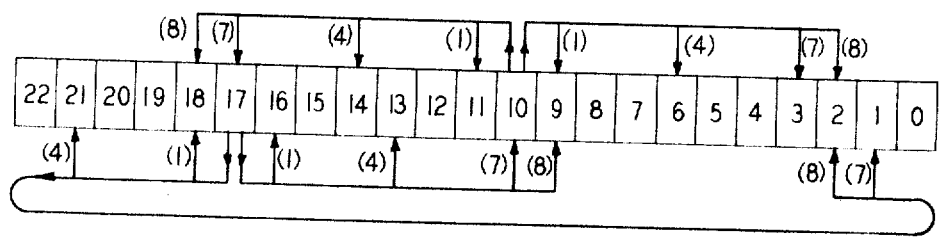
FIGS. 3–5 are diagrams illustrating the method of the invention, and the particular gating scheme on which the illustrative embodiment of the invention is based.
Figure 4:
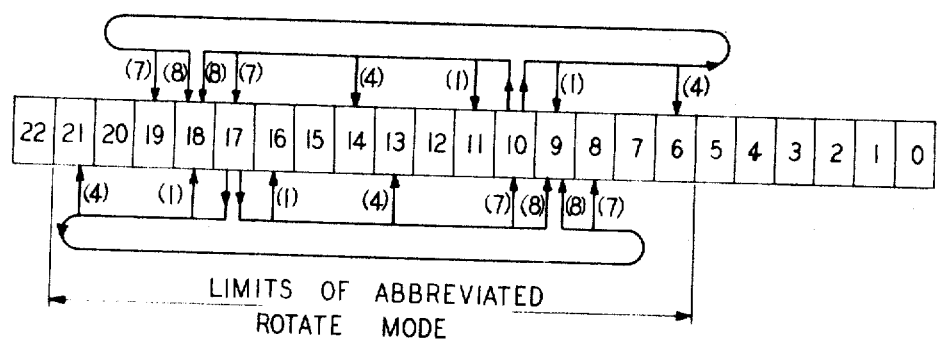
Figure 5:
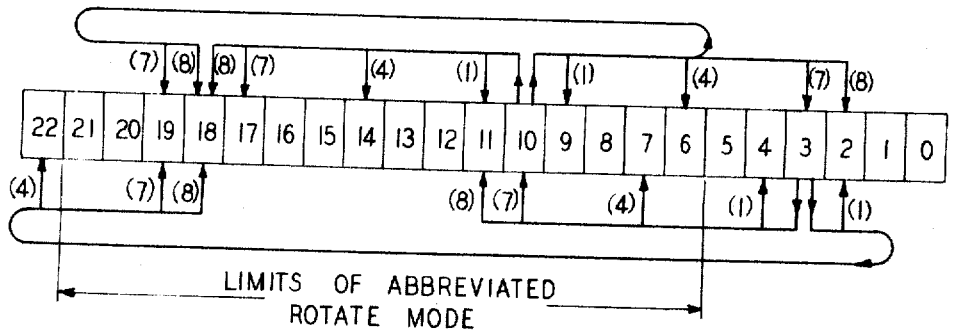

*Method and gating scheme of the invention: FIGS. 3–5*

FIG. 3 illustrates some of the gating path connections from stages 10 and 17 to other stages of a 23-stage register. (FIG. 3 does not show the gating paths required for these two stages to operate in the abbreviated rotate mode.) Each stage is connected through individual gates to 4 other stages, to both the left and the right, a total of 8 in all. The numbers in parentheses indicate the number of stages separating stage 10 or 17 from each of the stages to which it is connected. The bit in stage 10, for example, may be transferred directly in one step to any one of the eight stages 2, 3, 6, 9, 11, 14, 17 and 18.

The connections of stage 17 to other stages are similar to those for stage 10. Because rotation orders may be executed as well as shift orders, bits shifted out of the left end of the register are inserted in the right end. In determining the relative positions of the stages the register may be considered to be circular in shape with stages 22 and 0 being connected together. Thus the stage 7 positions to the left of stage 17 is stage 1, and the stage 8 positions to the left is stage 2. The connections from stage 17 at the left end of the register to the right end are required only for a rotation operation. For a shift operation, bits shifted out of the left end of the register are not reinserted at the right end. Thus the bit in stage 17 is shifted out of the register during left jumps of 7 or 8 positions in a shift operation. The gating connections to stages 1 and 2 are never established during a shift operation, and may be made only when the register word is rotated 7 or 8 positions to the left.

FIG. 3 shows the connections required from stages 10 and 17 to the other stages for executing both rotate and shift orders. These stages require additional gates for abbreviated rotate orders to be executed, as shown in FIG. 4. When operating in the abbreviated rotate mode, stages 6–21 are treated as an independent register, with each stage being connected to the others 1, 4, 7 and 8 positions away to both the right and the left. The connections of stage 10 to the four stages to its left for the abbreviated rotate operation are the same as those in FIG. 3. The connections to the right, however, are the same only for the stages 1 and 4 positions away from stage 10. In the abbreviated rotate mode, the stages 7 and 8 positions away from stage 10 to the right are respective stages 19 and 18, rather than 3 and 2 as in FIG. 3. Similarly, the connections of stage 17 to the stages to its right in the abbreviated rotate mode are the same as those in FIG. 3. Only two of the connections to the left, however, are the same, those to stages 18 and 21. The stages 7 and 8 positions to the left of stage 17 in the abbreviated rotate mode are respective stages 8 and 9, rather than stages 1 and 2 as in FIG. 3.

All of the connections required from stages 10 and 17 to other stages are derived by combining those shown in FIGS. 3 and 4. Thus stage 10 is connected to all of stages 2, 3, 6, 9, 11, 14, 17, 18 and 19, and stage 17 is connected to all of stages 1, 2, 8, 9, 10, 13, 16, 18 and 21. It should be noted that the bit in stage 10 must reach stage 18 when rotating 8 positions to either the right or the left in the abbreviated rotate mode, and when shifting 8 positions to the left in executing shift or rotate orders. Similarly, the bit in stage 17 must reach stage 9 when rotating to either the left or the right in the abbreviated rotate mode, and when shifting 8 positions to the right in executing shift or rotate orders. Thus only one gating path is required to transfer the bit from stage 10 to stage 18, the gates in this path operating when either one of two steps occurs—a jump to the left of 8 positions in any mode of operation, or a jump to the right of 8 positions in the abbreviated rotate mode. Similarly, only a single gating path is required for connecting stage 17 to stage 9, the gates in this path also operating on either one of two jumps.

The various gate connection required for the entire register may be derived from an analysis similar to that above for stages 10 and 17. An orderly pattern would be obtained were it not for the abbreviated rotation which is possible within stages 6–21. As can be seen in FIG. 4, shifting of the bit in stage 10 to the left and the bit in stage 17 to the right is the same for both shift, rotate, and abbreviated rotate orders. Deviations occur when shifting the bit in stage 10 to the right and the bit in stage 17 to the left, both in the abbreviated rotate mode. In fact, the bits in stages 6–13 always go to the same stages on the left, and the bits in stages 14–21 always go to the same stages on the right regardless of the type of order. It is only when these two groups of bits move in the opposite directions that additional connections must be made for carrying out abbreviated rotate orders.

In FIG. 5 all of the connections required from stages 3 and 10 to other stages of the register are shown. The connections from stage 3 to the four stages 1, 4, 7 and 8 positions to both its right and left are the only ones required for this stage; the abbreviated rotate mode requires no additional connections because stage 3 is not within the group 6–21. The connections for stage 10, however, are all of those shown in both FIGS. 3 and 4, FIG. 3 showing the connections normally required for shifting and rotating, and FIG. 4 showing the connections required when the rotation is in the abbreviated mode. From FIG. 5 it becomes apparent that certain simplifications, in addition to those described with reference to FIG. 4, may be made in implementing the design of the system. For example, stage 11 may be a destination of the bit in stage 10 on all types of orders where the shifting is to the left, and may similarly be a destination for the bit in stage 3 on all types of orders where the shifting is to the left. Stage 2 may be a destination for the bit in stage 10, or a destination for the bit in stage 3 in normal shift or rotate orders to the right. Stage 19 may be a destination for the bit in stage 3 on rotate orders to the right, or a destination for the bit in stage 10 on abbreviated rotate orders to the right. Stage 18 may be a destination for the bit in stage 10 on all orders where shifting is to the left, or on abbreviated rotate orders to the right. Stage 18 may also be a destination for the bit in stage 3 on rotate orders to the right. Many simplifications may be made to avoid redundancy in the implementation of the system. The system shown in detail in FIGS. 6–21 has been simplified in a manner based on the observation just made, and will be explained below.

*Basic gate circuit used in illustrative embodiment of the invention—FIG. 23*

All of the gates used in the illustrative embodiment of the invention are of the same type. The basic gate circuit is shown in FIG. 23A, FIG. 23B showing the symbolic notation for the gate used throughout the detailed drawing. FIG. 23C is a table indicating the output of a two-input gate for the four combinations of input signal levels.

The operation of the gate may be succinctly described as follows: the output is low (0) only if all inputs are high (1). Conversely, the output is high if at least one input is low. Throughout the illustrative embodiment of the invention, low level (ground) signals represent 0's, and high level signals represent 1's. Referring to FIG. 23A, if all inputs are high all of the input diodes are reverse biased. Consequently, current flows from source 2300 through resistor 2301, diode 2302 and the base-emitter junction of transistor 23Q1. The transistor conducts and the output is short-circuited through the transistor to ground. Thus, if all inputs are high, the output is low. However, if at least one input is low, current from source 2300 flows through the respective input diode to the low level input source. Current does not flow through diode 2302, and transistor 23Q1 remains nonconducting. The collector of this transistor, the output of the gate, is thus high, equal in magnitude to the potential of source 2303. All that is required is for one of the inputs to be low for the output to be high.

FIG. 23C illustrates the operation of the gate when only two inputs are provided. The output of the gate is a 1 if either input (or both) is a 0. If a particular gate has four inputs, for example, the output will be a 1 if at least one of the four inputs is a 0. With only one input a gate functions as an inverter. If the input is low the output is high, and if the input is high the output is low.

The particular gate employed in the illustrative embodiment of the invention is particularly advantageous for the following reason. An AND gate may be constructed merely by connecting various gate outputs together. Referring to FIG. 23A it will be noted that even though transistor 23Q1 may not conduct, the output may still be low if the output terminal is shorted to ground through the transistor in some other gate whose output terminal is connected to the collector of transistor 23Q1. For example, if the outputs of four other gates are tied to the collector of transistor 23Q1, the junction, i.e., the common output, will be a 0 if the output of any one of the gates is a 0. The common output will be high only if all of the individual outputs are high. Thus if the outputs of four gates, each having three inputs, are tied together, the common output of the four gates will be a 1 only if the output of each individual gate is a 1. This in turn requires that at least one input of each of the gates be a 0.

*Detailed circuitry of a register stage: FIG. 25*

The register in the illustrative embodiment of the invention is comprised of 23 identical stages. Each stage has six inputs and two outputs. The stages are numbered 00 through 22, and the details of each stage are shown in FIG. 25. The two missing digits in the various conductors serve to indicate that the circuit represents any one of the 23 stages. Some of the stages have two SP conductors as inputs, and the others have instead two SPS conductors as inputs. The two types of inputs serve the same function, and accordingly no differentiation is made between them in FIG. 25. FIG. 25A shows the register stage in block diagram form, this form being used to represent a register stage in the detailed illustrative embodiment of the invention. FIG. 25D shows the actual circuitry of one of these stages. FIG. 25B shows the voltage level on each of the output conductors K—0 and K—1 for each of the two states of the stage. When the stage represents a 0, the 0 output is high and the 1 output is low. When the stage represents a 1, the 0 output is low and the 1 output is high.

A binary value may be written into a stage in one of two ways. The input information may originate from an external source, or from the shifting circuitry. In other words, the digit for a particular stage may come from an external source, or from another stage in the register. The inputs S—0 and S—1 from an external source are required in order for new words to be written into the register. Otherwise, the circuitry of the invention could only shift and rotate the word initially stored in the register when it is first constructed. The N—0 and N—1 leads are used when writing a bit derived from another stage. A pulse must first appear on each of the SP or SPS leads in order for a bit derived from another stage to be written into the stage.

When the state of the stage is a 0 transistor Q2 is off, and transistor Q1 is on. These two transistors comprise a flip-flop. When transistor Q2 is off the potential of source 2500 is extended to output K—0, and this output is high. Output K—1 is at this time shorted through transistor Q1 to ground. Similarly, when the state of the stage is a 1 transistor Q1 is off, and the potential of source 2501 is extended to output K—1. At this time output K—0 is shorted through transistor Q2 to ground. A 1 is written into the stage from an external source when a high level input is applied to input conductor S—0, and a low level input is applied to input conductor S—1. Diode 2504 is forward biased and the potential of source 2503 is extended through it to ground. This action removes the base drive from transistor Q1 to turn this transistor off. The potential of source 2503 is then extended to the base of transistor Q2 to turn this transistor on, since diode 2502 is reverse biased (S—0=1), as is the cross-coupling diode 2522 to the collector of Q1. Similarly, a 0 is written into the stage when a high level input is applied to input S—1, and a low level input is applied to input S—0. At this time diode 2502 is forward biased and transistor Q2 turns off. Output K—1 goes low and output K—0 goes high.

The state of the stage may also be changed depending on the signals applied to the inputs N—0 and N—1. As seen from FIG. 25C if a high level signal is applied to input N—0, and a low level signal to input N—1, a 0 will be written in the stage, i.e., output K—0 will be high and output K—1 will be low. Similarly, a 1 may be written in the stage when input N—0 is low and input N—1 is high, output K—0 going low and output K—1 going high at this time. No matter what voltages exist on inputs N—0 and N—1, however, no change in the state of the stage occurs unless both of the SP or SPS inputs are pulsed. These inputs are normally connected to ground. The state of the stage may be controlled in accordance with the potential at inputs N—0 and N—1 only if high level pulses are first applied to both SP or SPS conductors.

Suppose the stage is in the 0 state with transistor Q1 conducting, and transistor Q2 off. To switch to the 1 state a high level signal must be applied to the N—1 input. Transistor Q3 is normally nonconducting. The SP or SPS lead is at ground potential and current from source 2505 flows through either diode 2506 or both of diodes 2506 and 2507 to ground. The base of transistor Q3 is thus held at ground potential and the transistor remains off. A positive potential applied to conductor N—1 has no effect on the circuit as long as the right-most SP or SPS conductor is grounded. Diode 2506 shorts the base of the transistor to ground independent of the voltage on the N—1 input. However when the SP or SPS conductor goes high diode 2506 is reverse biased. Transistor Q3 remains off if conductor N—1 is low in potential for diode 2507 now shorts the transistor base to ground. But if input N—1 goes high both of diodes 2506 and 2507 are reverse biased. At this time transistor Q3 conducts, and the emitter of this transistor goes high in potential. Diode 2508 is reverse biased, and the junction of this diode and resistor 2509 is no longer connected through the diode and resistor 2510 to ground. Current now flows from source 2511 through resistor 2509, and charges capacitor 2512 through diode 2513 and transistor Q1 to ground. At the termination of the pulse on the SP or SPS conductor transistor Q3 ceases to conduct and the junction of capacitor 2512 and diode 2508 goes low. Capacitor 2512 begins to discharge through diode 2514 and resistor 2515 to ground. The negative potential applied to the base of transistor Q1 diverts the base drive to Q1 and turns this transistor off. Due to the cross coupling between transistors Q1 and Q2, transistor Q2 turns on at this time. Thus to switch the stage to the 1 state a high level signal is applied to input N—1. A low level signal is applied to input N—0; transistor Q4 remains nonconducting and exerts no control on the conduction of transistor Q2. When transistor Q1 turns off transistor Q2 turns on.

Similarly, if transistor Q2 is conducting and a high level signal is applied at input N—0 and a low level signal at input N—1, transistor Q2 turns off and transistor Q1 turns on. The circuit is symmetrical and a similar operation occurs each time the state of the stage is switched.

If transistor Q1 is off, i.e., the stage is in the 1 state, the high level signal on conductor N—1 has no effect on the circuit. The stage is already in the 1 state and need not be switched. With transistor Q1 off the conduction of transistor Q3 has no effect on the circuit. Capacitor 2512 is not charged because there is no path through transistor Q1 to ground. Consequently when transistor Q3 turns off at the termination of the SP or SPS pulse there is no discharge of the capacitor as it has not charged to begin with. Similar remarks apply if the stage is in the 0 state and a high level signal is applied at input N—0.

In summary, the state of the stage may be controlled by external complementary signals applied to inputs S—0 and S—1. The state of the stage may also be controlled by complementary signals applied to inputs N—0 and N—1. In the latter case no changes occur unless pulses appear on the SP or SPS conductors, and the state of the stage switches (if there is any change) only at the termination of the SP or SPS pulses.

*Detailed illustrative embodiment of the invention:*
*FIGS. 6–21*

Figure 19:
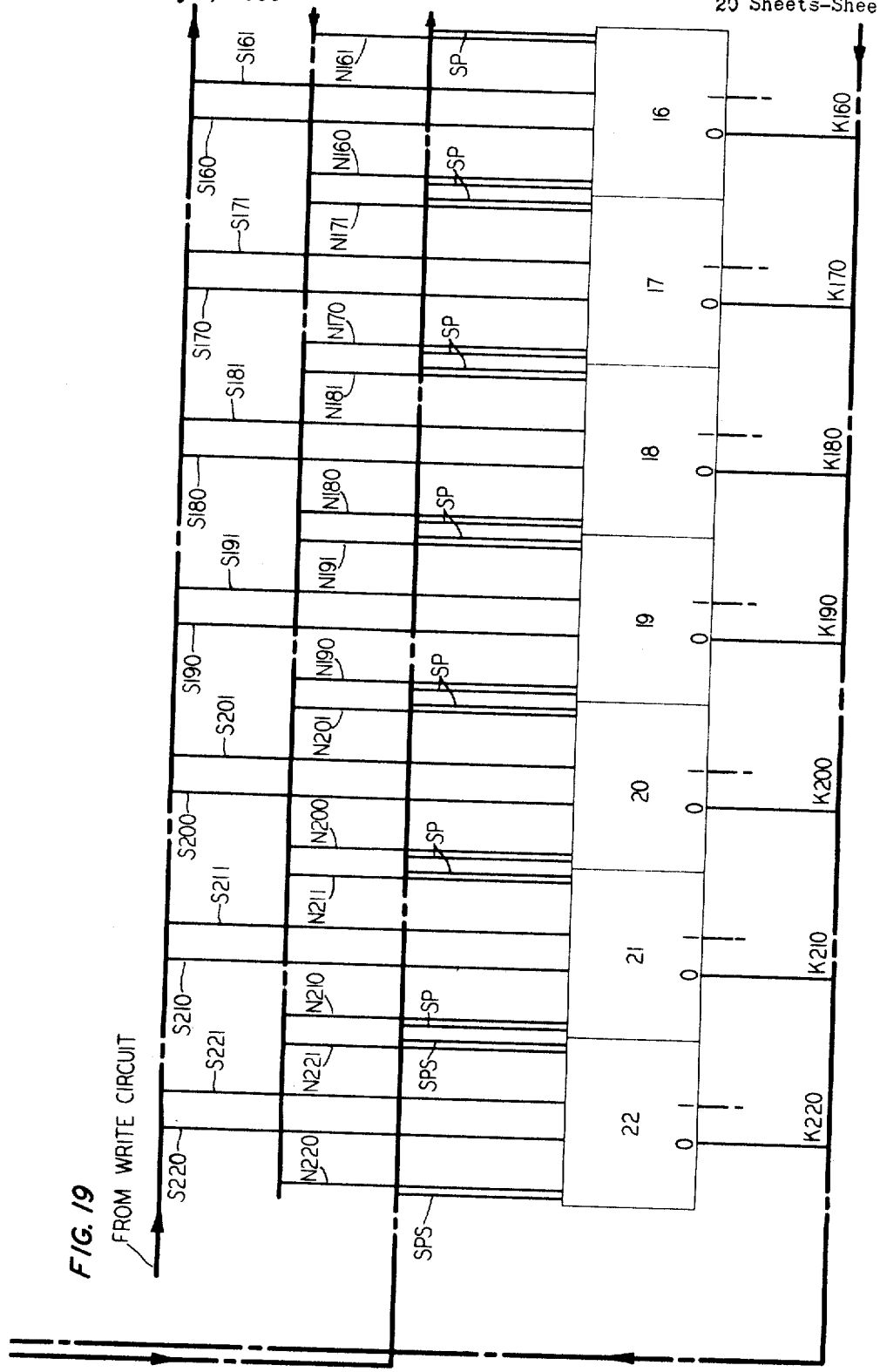
Figure 20:
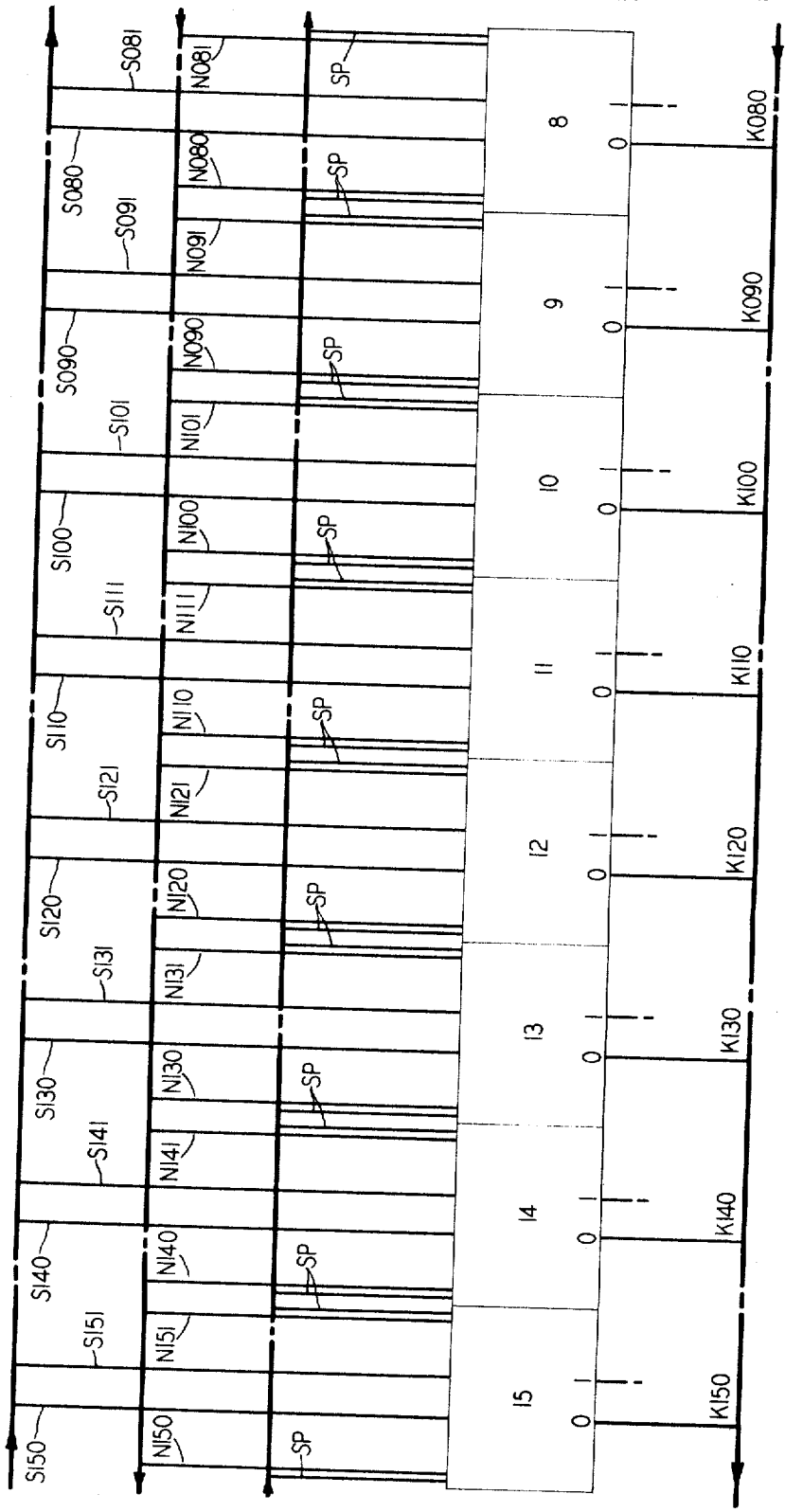
Figure 21:
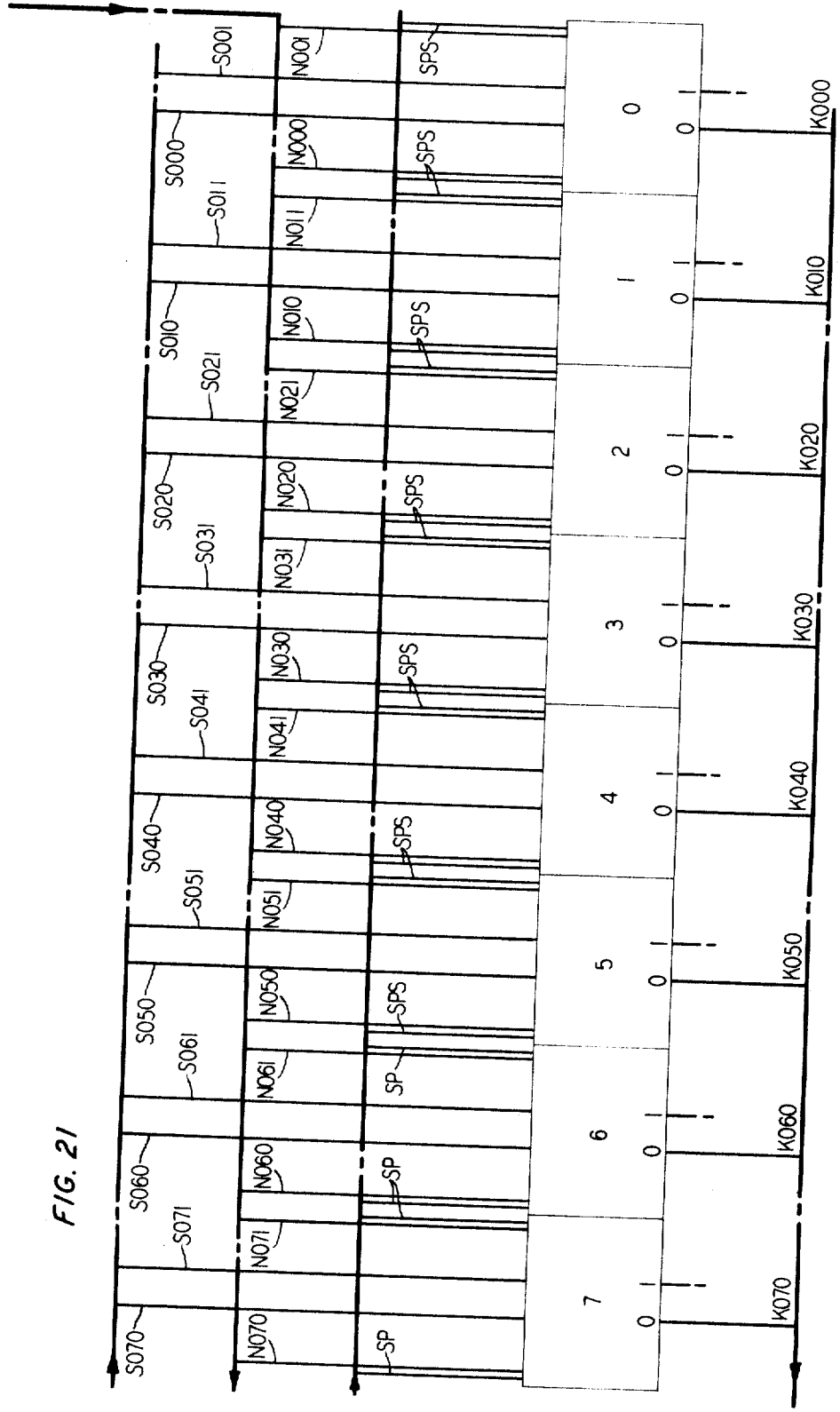

A 23-stage register is shown in FIGS. 19–21. Each of the stages has respective S—0 and S—1 input conductors. These conductors are extended to a write circuit (not shown) and complementary signals on any pair of input conductors control the state of the particular stage. The invention is a circuit for manipulating the bits within the register once they are first written into it. The SPS conductors are extended to each of stages 0–5 and 22. A pair of SP conductors are connected to each of stages 6–21. Only the SP conductors go high when the circuit is operating in the abbreviated rotate mode. Three successive pulses may be applied to each of these conductors for enabling three or fewer bits to be successively written into each of stages 6–21. The SPS conductors go high along with the SP conductors only during a normal shift or rotate operation.

Each of the stages is also provided with a pair of N—0 and N—1 conductors. Signals on these conductors control the writing of bits in each stage (at the termination of SP or SPS pulses) in accordance with FIG. 25C. Each stage is also provided with a K—0 conductor. In FIG. 25D the detailed register stage contains two output conductors. However only one is required in the invention. A K—0 conductor is high if the respective stage is in the 0 state, and is low if the respective stage is in the 1 state. The potential on the K—0 conductor thus provides all the information that is required regarding the present state of the respective stage, and it is the K—0 conductors which are used in the illustrative embodiment of the invention for determining the state of each stage. (The K—0 and K—1 conductors of each stage may be used for reading bit information out of the register when it is required by other parts of the data processing system. The reading equipment is not shown since it is not necessary for an understanding of the present invention.)

The input control information to the shift and rotate circuit of the invention is of three kinds. First, it is necessary to specify the type of operation: shift, rotate, or abbreviated rotate. Second, the direction of the shifting or rotation must be specified. Third, the magnitude of the shift must be given.

Figure 6:
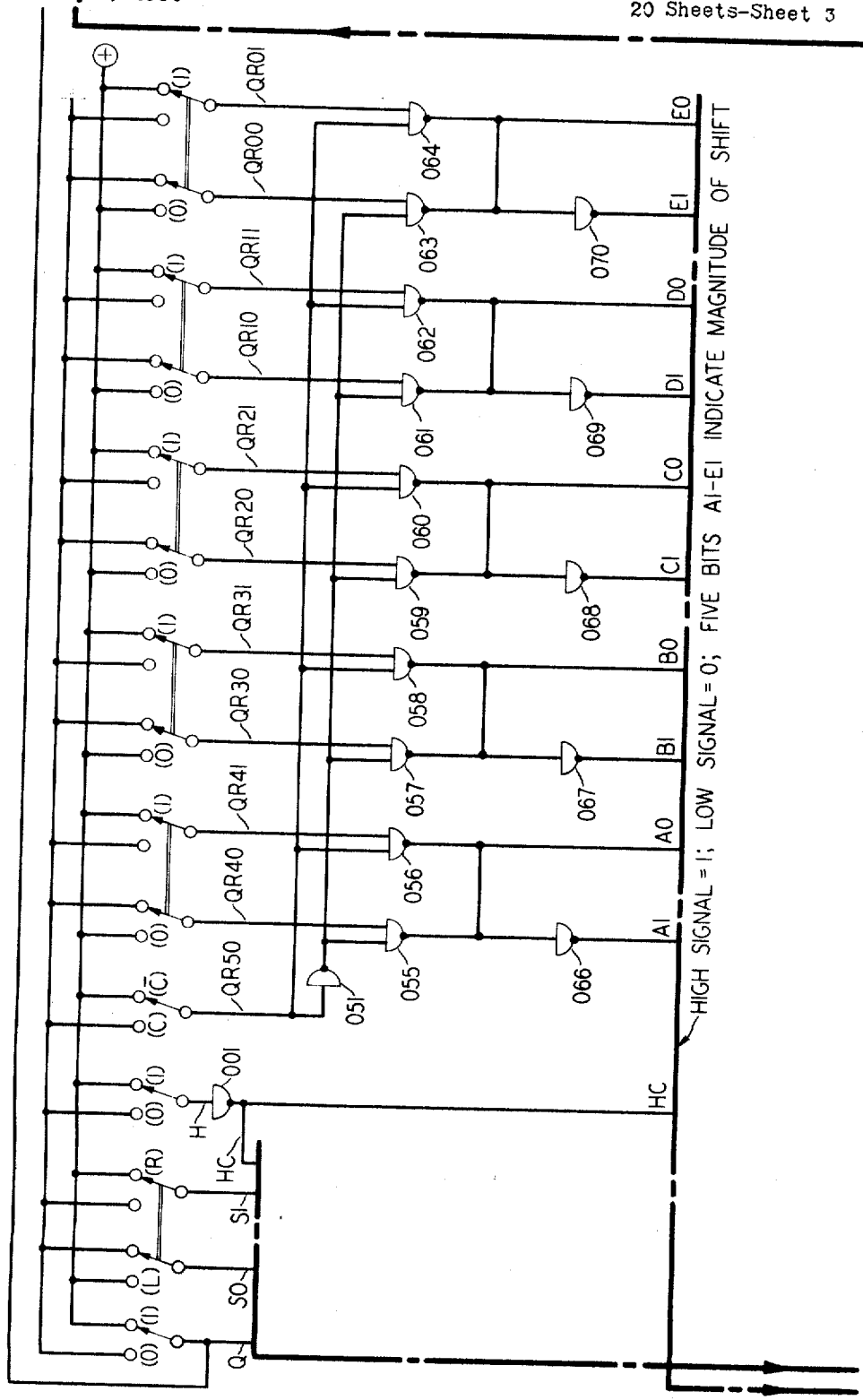

The input information is derived on FIG. 6. A single switch controls the application of complementary potentials on conductors S0 and S1 on FIG. 6. When the switch is to the right, S1 is high, S0 is low, and the shifting is to the right. When the switch is in the left hand position S0 is high, S1 is low, and the shifting is to the left. Although in FIG. 6 the input information is controlled by a series of manually operated switches, it should be understood that in a typical present-day data processor the input information would be derived from the electronic decoding of an order. The switches have been shown only to simplify the drawing.

A single switch controls the application of a positive or ground potential to the Q conductor, and another switch controls the potential of the H conductor on FIG. 6. The high potentials represent binary 1's, and the low potentials represents binary 0's. Table A shows the type of order executed for the four combinations of H and Q control signals:

TABLE A

| Type of Order | H | Q |
|---|---|---|
| Rotate | 1 | 1 |
| Abbreviated Rotate | 1 | 0 |
| Shift | 0 | 1 |
| None | 0 | 0 |

The signals on the HC conductors are merely the complement of the signal on the H conductor due to the inverting action of gate 001 on FIG. 6. Thus the potentials on conductors Q and HC determine the mode of operation, and the complementary signals on conductors S0 and S1 determine the direction of shifting.

On FIG. 6 five switches are provided for applying complementary signals to the ten conductors QR01 through QR40. When any switch is to the right the potentials on the respective QR–0 and QR–1 conductors represent a binary 1. When a switch is to the left the potentials represent a binary 0. The five bits thus provided are sufficient to represent shifts of any magnitude required for a 23-stage register. The switch connecting conductor QR50 to either a positive or ground potential controls the complementing of the bits supplied by the other QR switches. When conductor QR50 is at a positive potential the potential on each of conductors QR01 through QR40 is extended to the respective one of conductors E0–A1. For example, when QR50 is at a positive potential, the potential of E0 is the inverse of the potential of QR01, and the potential of E1 is the same as that of QR01. When conductor QR50 is at ground potential the potential on each of conductors E0–A1 is the inverse of the potential on the respective one of conductors QR01–QR40. The complementing action provided by the switch connected to conductor QR50 is included in the illustrative embodiment of the invention to illustrate the flexibility of the invention. The signals which directly control the magnitude of the shift appear on conductors E0–A1. These signals may be derived in any known manner, two of which (depending on the position of the QR50 switch) are shown in FIG. 6. Table B illustrates the potentials appearing on conductors E0 and E1 for each position of the respective switch, and for each position of the "complementing" switch. A "C" indicates that the input bits are complemented, and a "C̄" indicates that they are not.

TABLE B

| QR0 | QR00 | QR01 | QR50 | 064 | 063 | E0 | E1 |
|---|---|---|---|---|---|---|---|
| (1) | 0 | 1 | 0(C) | 1 | 1 | 1 | 0 |
|  | 0 | 1 | 1(C̄) | 0 | 1 | 0 | 1 |
| (0) | 1 | 0 | 0(C) | 1 | 0 | 0 | 1 |
|  | 1 | 0 | 1(C̄) | 1 | 1 | 1 | 0 |

Assume that the rightmost switch of FIG. 6 is in the right hand position, i.e., it represents a binary 1. This is shown in the table by a (1) in the QR0 column. QR00 is thus at a low potential and QR01 is at a high potential. If QR50 is high (no complementing) positive potentials are applied to both inputs of gate 064. The output is thus low. Because conductor QR00 is low in potential the output of gate 063 would normally be high, as shown in the table. But since the outputs of gates 063 and 064 are tied together to form an AND gate, the low potential controls and E0 is low. Gate 070 serves as an inverter and E1 is high in potential. On the other hand, if the potential on conductor QR50 is low, to complement the 1 represented by the rightmost switch, the outputs of both gates 063 and 064 are high. Conductor QR50 is connected to one input of gate 064 and the 0 on this conductor causes the output of gate 064 to be high. Although gate 051 inverts the potential on conductor QR50 and applies a high potential to one input of gate 063, the other input is connected to conductor QR00 which is low. Consequently the output of gate 063 is also high. Since both outputs are high, conductor E0 is high and conductor E1 is low. Similar remarks apply to the remaining four pairs of switches and output conductors D0–A1.

In summary, if any switch is to the right, representing a binary 1, in the absence of complementing the respective one of conductors A0–E0 is low and the respective one of conductors A1–E1 is high. If the input bit is complemented the potentials are reversed. The particular circuit for supplying the potentials on conductors A1–E0 may be one of many. It is the potentials on these ten conductors which control the magnitude of the shift. A particular pair of conductors such as E0 and E1 represent a 1 if E0 is low and E1 is high. The same pair represents a 0 if E0 is high and E1 is low. The five bits represented by the ten conductors A1–E0 determine the magnitude of the shift, with the rightmost digit being the least significant. Thus if the potentials on these ten conductors represent the number 10010, the register word is shifted 18 positions. The direction of the shift is determined by the potentials on conductors S0 and S1, and the mode of operation is determined by the potentials on conductors H and Q.

The potentials on the four conductors HC, Q, S0 and S1 on FIG. 6 determine both the mode of operation and the direction of the shift. The Q conductor is extended to FIG. 7, and all four of conductors Q, HC, S0 and S1 are extended to FIG. 10. The circuitry of FIG. 7 will be shown below to control the energization of the SP and SPS inputs of the register stages. All the information required to determine whether the SPS conductors are to be energized as well as the SP conductors may be determined by the potential on conductor Q. As seen in Table A only if the Q bit is 0 does the circuit operate in the abbreviated rotate mode, i.e., only SP leads are energized. If the Q bit is a 1 the operation is either a rotation or a shift, and the SPS leads are energized together with the SP leads. Consequently, the Q bit is sufficient to determine whether the SPS leads are energized together with the SP leads.

Figure 10:
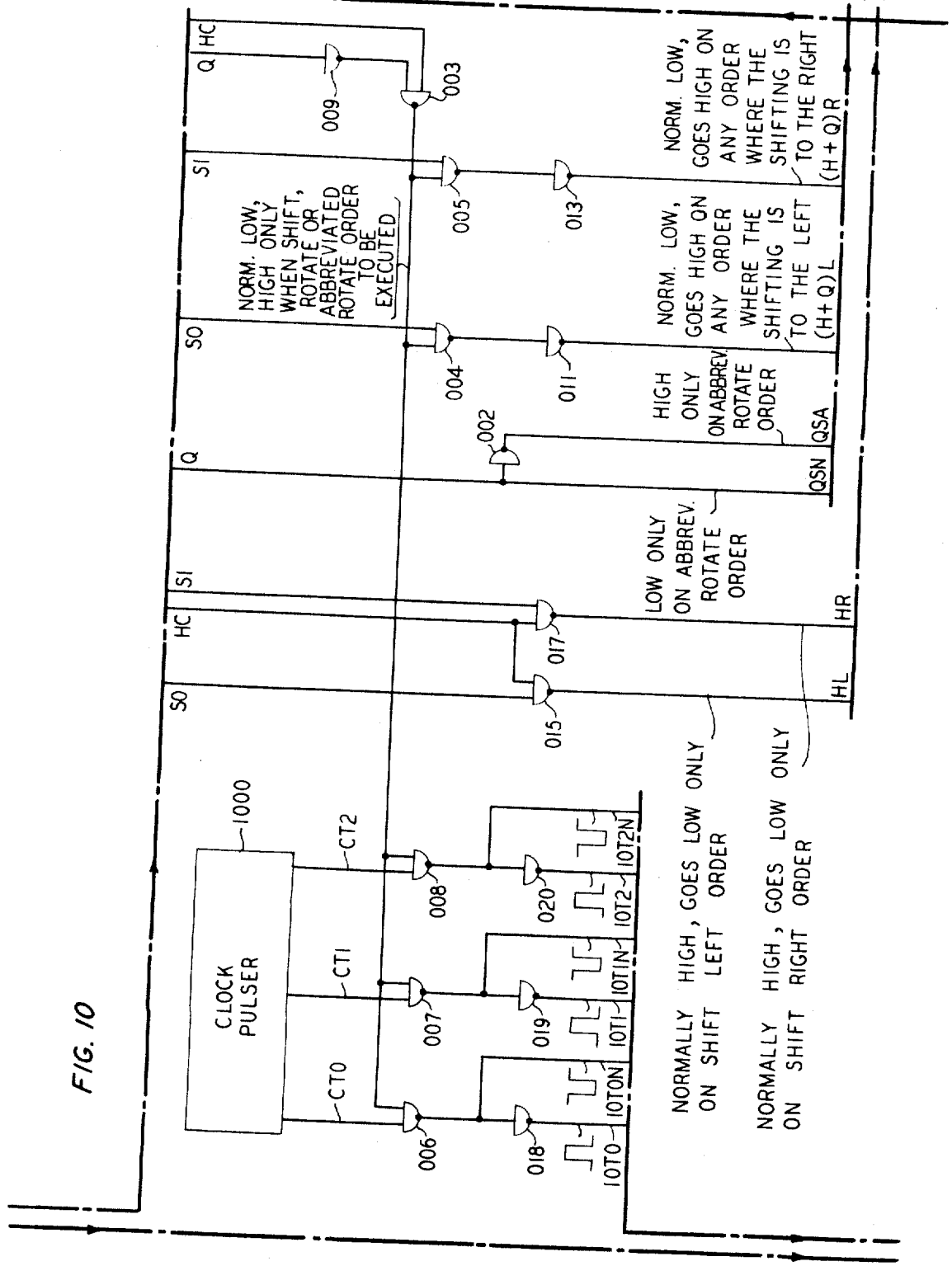

The circuitry on the right half of FIG. 10 derives certain signals required to operate various gates in the system. In a shift operation in either direction it is necessary to write 0's in the stages at one end of the register. For a shift to the right 0's must be written in the leftmost stages. For a shift to the left 0's must be written in the rightmost stages. The H conductor is low only for shift operations, as seen above in Table A. Consequently, only in a shift operation is the HC conductor high. The S1 conductor is high for a right shift. Thus both inputs to gate 017 on FIG. 10 are high for a right shift. The HR conductor goes low only when a right shift is executed. At this time the HL conductor is high because conductor S0 is low. For a left shift conductor S1 is high. Thus when shifting is to the left both inputs of gate 015 are high and the HL conductor is low. If the order being executed is either rotate or abbreviated rotate, the HC conductor is low. Both the HL and HR conductors are thus high since it is not necessary to write 0's at either end of the register. In summary, the HL and HR conductors are both normally high. The HR conductor goes low only when a shift order (as contrasted with both a rotate and abbreviated rotate order) is being executed, with the direction of the shift being to the right. The HL conductor is normally high and goes low only when an order to shift to the left is executed.

If both the H and Q bits are 0 no order is to be executed. The HC conductor on FIG. 10 is high at this time, and a 1 is applied to one input of gate 003. Gate 009 inverts the low signal on the Q conductor and applies a 1 to the second input of gate 003. The output of this gate is thus low only if no order is to be executed. The output of gate 003 is connected to one input of each of gates 004–008. The clock pulser 1000 applies three successive pulses to conductors CT0, CT1 and CT2, at the times shown in FIG. 24. A first 0.5 microsecond T0 pulse is applied to conductor CT0. This pulse controls a first parallel shift of the bits in the register. A half microsecond after the end of T0 a second T1 pulse is applied to conductor CT1 to control a second parallel shift of the bits in the register. A third 0.5 microsecond T2 pulse is applied a half microsecond after the end of T1 for controlling the third parallel shift of register bits. The execution of any order requires approximately only 2.5 microseconds. All of conductors CT0, CT1 and CT2 are normally low, and the outputs of gates 006–008 are thus normally high. The outputs of these gates go low only in the respective time periods when a shift is to be carried out. If an order is not to be executed however the outputs of gates 006–008 should remain high. The output of gate 003 is low when no order is to be executed. This output is one input of gates 006–008, and consequently the clock pulses are not transmitted through gates 006–008 unless an order has been given. Gates 018–020 serve as inverters. Thus successive positive pulses appear on conductors 10T0, 10T1 and 10T2 when an order is executed. Successive inverted pulses appear on conductors 10T0N, 10T1N and 10T2N.

The output of gate 003 is normally low and thus the output of each of gates 004 and 005 is normally high. When any of the three possible orders is to be executed the output of gate 003 goes high. If the shift is to the right conductor S1 is high and at this time the output of gate 005 goes low. Similarly, when the shift is to the left conductor S0 goes high and the output of gate 004 goes low. Gates 011 and 013 invert the signals at the outputs of respective gates 004 and 005. Thus conductor (H+Q)R is normally low in potential, and goes high only when the direction of shift in the order to be executed is to the right. Conductor (H+Q)L is normally low and goes high only when the shifting in the order to be executed is to the left. It will be noted that conductor (H+Q)R changes in potential on *any* order where the shifting is to the right. Conductor HR on the other hand changes in potential only on a shift order, as distinguished from the two rotate orders, where the shifting is to the right. Similar remarks apply to conductors (H+Q)L and HL.

The Q bit is a 0 only on abbreviated rotate orders. Conductors QSN on FIG. 10 is thus therefore low only on abbreviated rotate orders. Gate 002 serves as an inverter, and conductor QSA is thus high only on abbreviated rotate orders.

Figure 17:
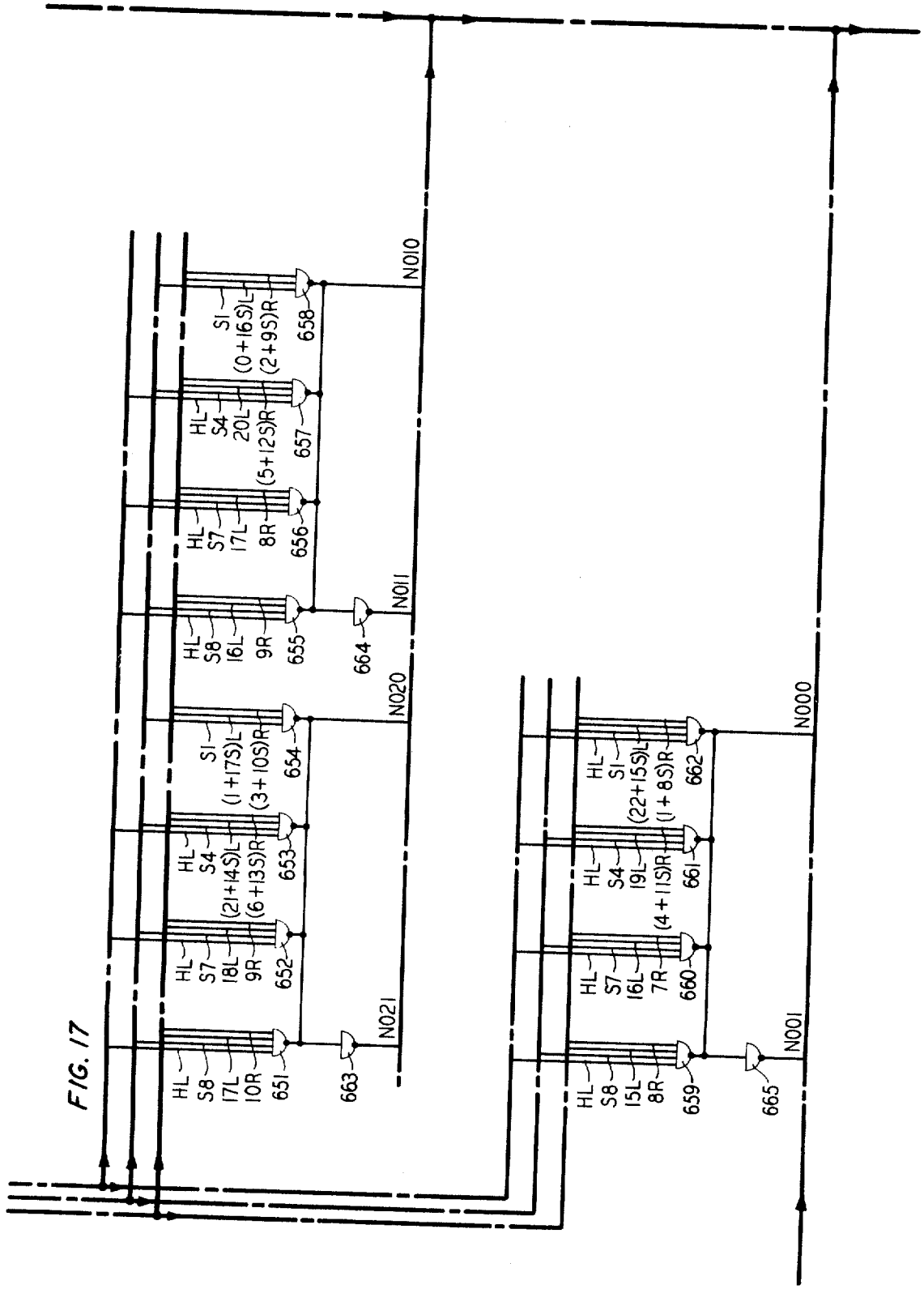
Figure 18:
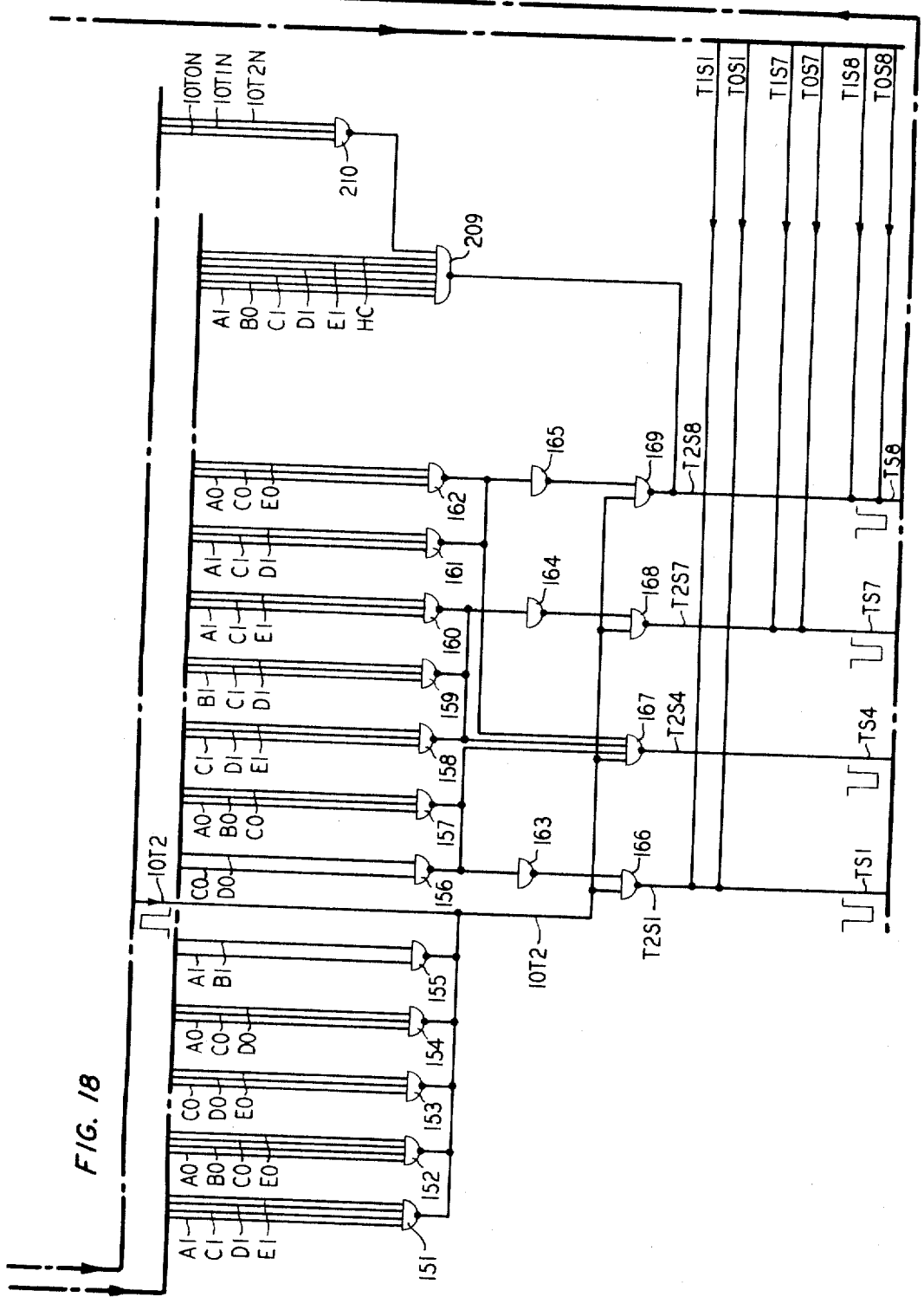

The first step in controlling the execution of an order is the determination of the magnitude of each of the three steps or shifts required. The three displacements are determined solely by the binary number represented on conductors A1–E0 on FIG. 6. The ten signals on these conductors are combined with the three clock pulses on FIGS. 14 and 18. At the bottom of FIG. 18 are four conductors TS1, TS4, TS7 and TS8. These conductors are normally high and go low when respective shifts of 1, 4, 7 and 8 positions are required. For example, assume that the magnitude of the shift on a particular order is 13 positions. During the first clock pulse a negative pulse appears on conductor TS1 and all bits in the register are shifted one position. (The direction is determined by the signals on conductors (H+Q)L and (H+Q)R.) When the second clock pulse is applied a negative pulse appears on conductor TS8, and all bits in the register are shifted another eight positions. When the third clock pulse is applied a negative pulse appears on conductor TS4 and all bits in the register are shifted the final four positions, to make a total of 13. The circuitry on FIGS. 3–9, 11–13, 15–17 and 19–21 need not distinguish between the three different clock pulses. All this circuitry needs to be told is the type of order, the direction of shift, and the number of positions to be shifted at any instant. The translation of the magnitude of the shift into three or fewer successive pulses on conductors TS1, TS4, TS7 and TS8 is accomplished on FIGS. 14 and 18.

The derivation of the three or fewer successive pulses on the TS conductors from the three clock pulses and the input signals on conductors A1–E0 proceeds as follows. Associated with each of conductors 10T0, 10T1 and 10T2 is a plurality of conductors such as TOS1, TOS7 and TOS8. During clock pulse T0 shifts of 1, 7 or 8 positions are permitted. Similar remarks apply to clock pulse T1. During the application of clock pulse T2 shifts of four positions are possible as well as shifts of 1, 7 or 8 positions. For this reason conductor 10T2 has conductor T2S4 associated with it as well as conductors T2S1 T2S7 and T2S8. On FIG. 14 the potentials on conductors T0S1, T0S7 and T0S8 are controlled by the T0 clock pulse. These three conductors are normally high in potential. Conductor T0S1 goes low only if the bits in the register are each to be shifted one position when the first clock pulse is applied. Conductor T0S7 goes low only if the bits are to be shifted seven positions when the first clock pulse is applied. Similar remarks apply to conductor T0S8. Conductor T1S1 goes low only during the application of the T1 clock pulse if the bits in the register are to be shifted one position in the second step of operation. Similar remarks apply to conductors T1S7 and T1S8. Conductor T2S1 goes low only if the bits in the register are each to be shifted one position when the third clock pulse is applied. Similar remarks apply to conductors T2S4, T2S7 and T2S8.

As described above it is not necessary to distinguish between clock pulses as far as the remainder of the circuitry is concerned. For this reason conductors T0S1, T1S1, and T2S1 are tied together to form an AND gate on FIG. 18, conductor TS1 being connected to the junction. Each of conductors T0S1, T1S1 and T2S1 is normally high in potential. If any one goes low conductor TS1 similarly goes low to control a shift of one position. For example as will be seen below for a shift of six positions the shifting takes place in steps of 1, 1, and 4 positions. Thus conductor TS1 goes low when both of clock pulses T0 and T1 are applied by the clock pulser. Similarly, conductors T0S7, T1S7 and T2S7 are tied together to form an AND gate, and a negative pulse may appear on conductor TS7 when any one of the three clock pulses is applied if during that time slot a shift of seven positions is required. Similar remarks apply to conductors T0S8, T1S8 and T2S8, and conductor TS8. As for conductor TS4, it is tied directly to conductor T2S4. Shifts of four positions are possible only when the third clock pulse is applied. Since there are no T0S4 and T1S4 conductors, conductor TS4 is connected only to conductor T2S4. A negative pulse may appear on conductor TS4 only in the third step of operation if a shift of four positions is required.

Figure 7:
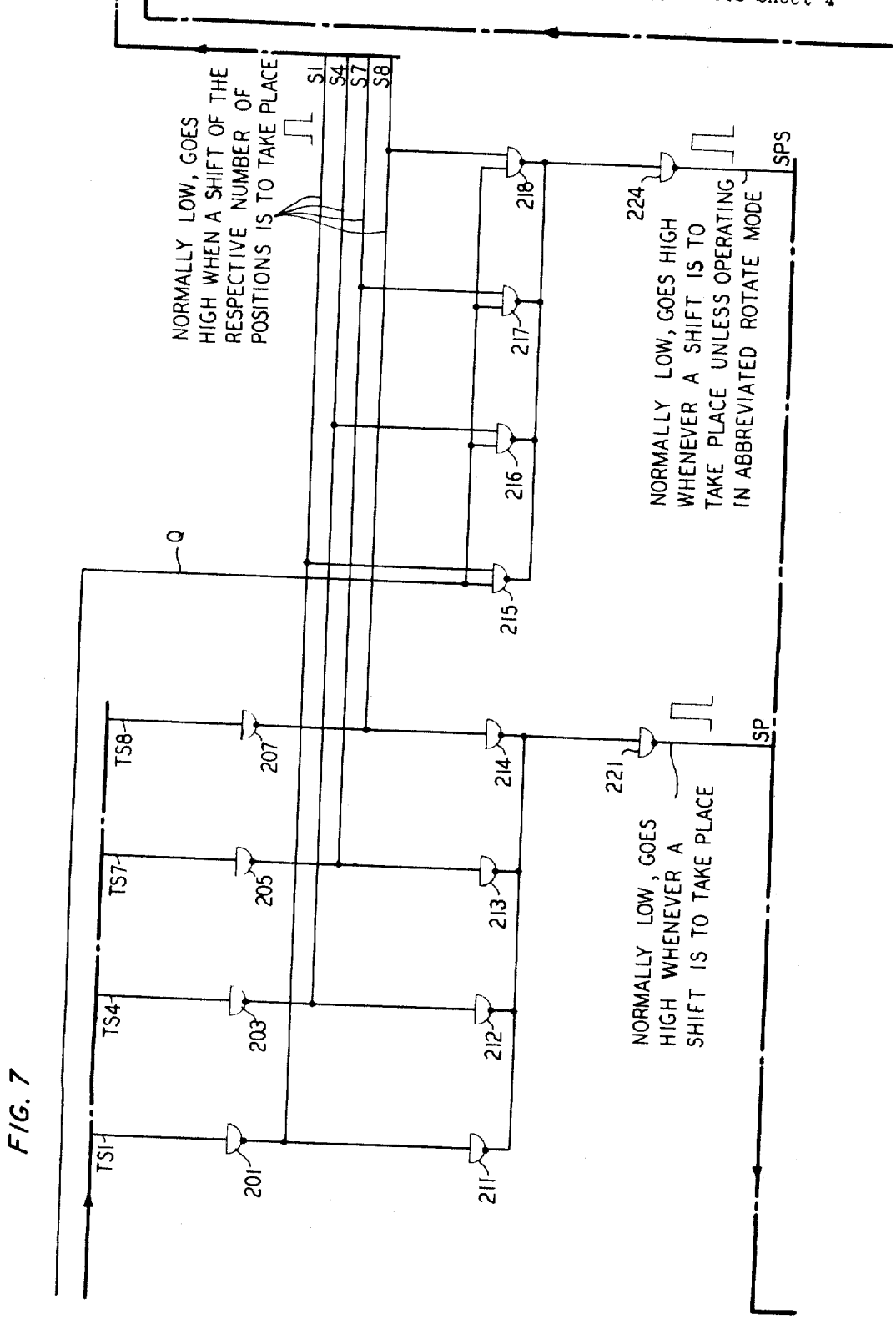

The four conductors TS1, TS4, TS7 and TS8 each is connected through an inverter to a respective one of conductors S1, S4, S7 and S8 on FIG. 7. Thus a positive pulse appears on one of these conductors whenever a shift of the respective magnitude is required. A pulse may appear on at most one of conductors S1, S4, S7 and S8 at any time. It is these four conductors which control the actual parallel shifting of the bits in the register. Table C indicates the steps required for any given displacement.

The output conductors A1–E1 carry the binary bits whose decimal equivalents are shown in the "Shift No." column. For each possible shift magnitude the shifting takes place in a maximum of three steps. The number of shifts occurring when each of the three clock pulses is applied is shown in the third section of the table. The fourth section shows essentially the same information as the third, except that instead of merely showing the number of shifts per clock pulse, the lead which controls the number of shifts is designated. For example, to shift 13 positions a pulse appears on conductor T0S1 when the first clock pulse is applied, conductor T1S8 when the second clock pulse is applied, and conductor T2S4 when the third clock pulse is applied. The fifth section is another representation of the same information, and merely shows when each of the shift control conductors S1, S4, S7 and S8 goes high. The last section shows when the SP or SPS leads are energized. Whenever any shift occurs during the application of a particular clock pulse the SP or SPS leads must be energized to allow bits to be written into the register stages. For example, to shift five positions, shifts of 1 and 4 positions occur when the respective first and third clock pulses are applied. Since no bits are written into the stages, i.e., no shifting occurs, during the application of the second clock pulse, the SP and SPS leads go high only during T0 and T2. (The SP leads go high as described above, on all orders. The SPS leads go high only on shift and rotate orders, not on abbreviated rotate orders.)

The interpretation of almost all of Table C is straightforward. The entries for a shift of 23 positions require a bit more explanation. On a shift order, where the shifting is 23 positions, the word in the register is shifted completely out, and all 0's appear in the register. It would be possible to shift 23 positions with two shifts of seven positions each, and a third of eight. As will be described below, however, it is simpler to derive a command to shift eight positions three times in succession, and for this reason three shifts of eight positions each are provided when the entire word in the register is to be erased. These three shifts each of eight positions should not be executed however for rotate and abbreviated rotate orders of 23 positions in magnitude. The asterisks in the last row of the table indicate that on rotate and abbreviated rotate orders no action takes place if the magnitude of the shift is 23 positions. A rotation of 23 positions results in no change in the register contents. Consequently an order to rotate 23 positions may be ignored. An order to rotate 23 positions in the abbreviated mode is similarly ignored. It is not necessary to ever give such an order. Since only stages 6–21 are involved in the abbreviated rotate mode, all possible abbreviated rotate orders may be given by specifying a shift of 1–15 positions. If a number greater than 15 appears on conductors A1–E1 the abbreviated rotate order is still carried out. But the number of positions effectively shifted is merely the number specified minus 16. Thus an order to shift 21 positions in the abbreviated mode results in three successive shifts of seven positions each. The final contents of the register however will be the same as that obtained on an abbreviated rotate order of only 5 positions. If a shift of 23 positions is specified on an abbreviated rotate order as shown by the astericks in the table no shifts take place.

When clock pulse T0 is applied one of conductors T0S1, T0S7 and T0S8 may be energized with a negative going pulse. The logic circuitry for deriving a pulse on one of these three leads comprises two basic parts. A positive pulse normally appears on conductor 10T0 when the first clock pulse is applied. However it will be noted in FIG. 14 that the outputs of gates 101–105 are tied to conductor 10T0. If the output of any one of these gates is low the positive pulse does not appear on conductor 10T0. If the positive pulse does not appear on conductor 10T0 to begin with, no negative pulse may result on one of conductors T0S1, T0S7 or T0S8. Conductor 10T0 is connected to one of the inputs of each of gates 106–110, and if a 0 appears on conductor 10T0 all three conductors T0S1, T0S7 and T0S8 remain high in potential. Assuming that the first clock pulse does appear on conductor 10T0, the output of one of gates 106–110 goes low only if all of its inputs are high. If all of the input conductors to one of the gates are high the corresponding output conductor goes low.

Figure 14:
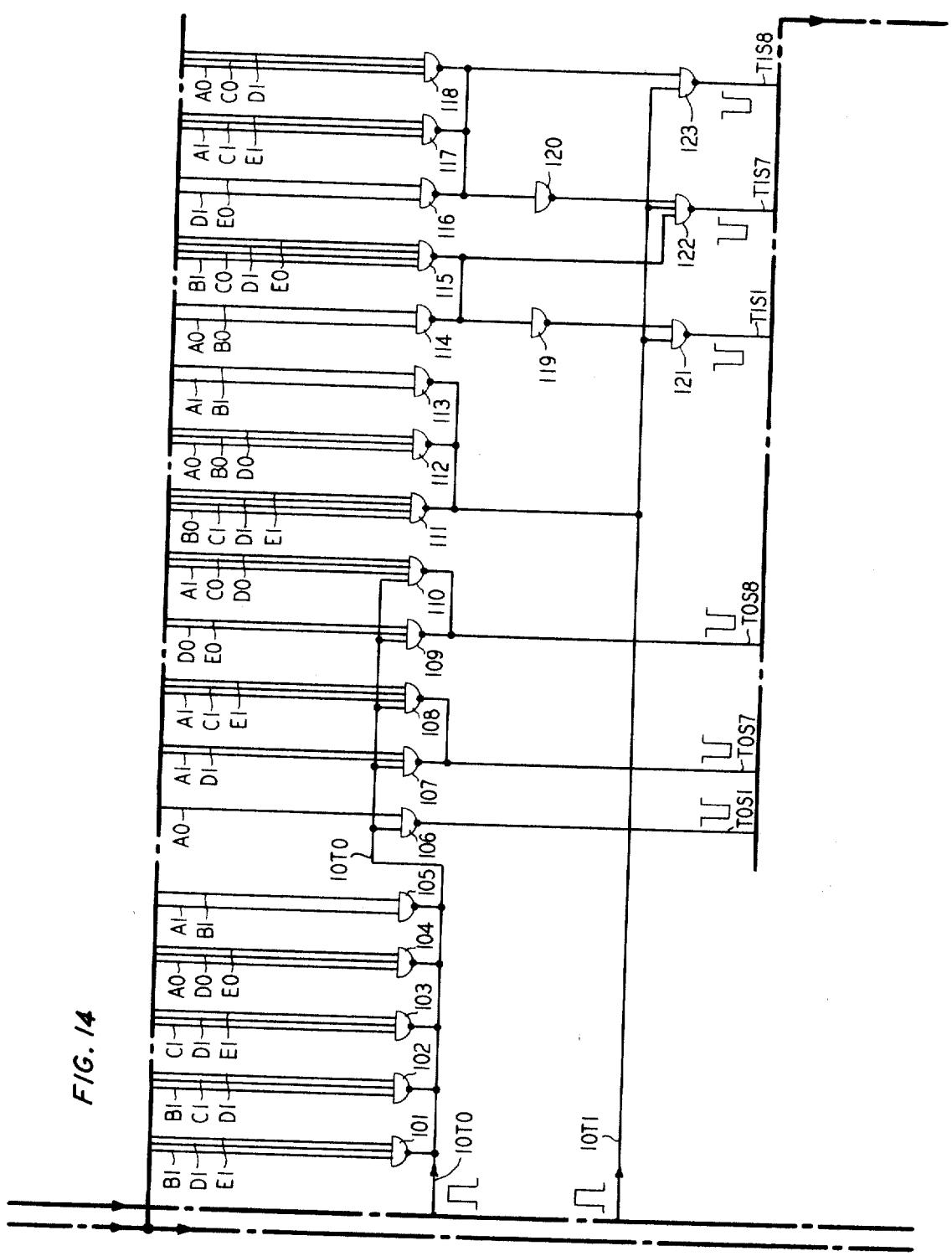

The operation of the gates 101–110 may be best understood by considering a few examples. Referring to Table C, consider all of the binary numbers whose respective B1, D1 and E1 bits are one. The only two numbers having all 1's in these three positions are 11 and 15. For shifts of either 11 or 15 positions it is seen from the table that none of conductors T0S1, T0S7 and T0S8 go low when the first clock pulse is applied. Referring to FIG. 14 it is seen that the three inputs to gate 101 are conductors B1, D1 and E1. Thus on an order to shift 11 or 15 positions all inputs to gate 101 are high and the output is low. Conductor 10T0 is shorted to ground and the first clock pulse does not appear on it. Consequently, none of gates 106–110 may operate and the outputs of all of conductors T0S1, T0S7 and T0S8 remain high.

Consider next gate 104 and its input conductors A0, D0 and E0. The output of gate 104 goes low whenever the three inputs are high. If conductors A0, D0 and E0 are high, conductors A1, D1 and E1 are low. It will be seen from the leftmost column of Table C that conductors A1, D1 and E1 are low when total shifts of 0, 4, 8, and 12 positions are specified. Thus when the order is to shift either 0, 4, 8 or 12 positions, gate 104 prevents any pulse from appearing on one of conductors T0S1, T0S7 and T0S8. Referring to the columns headed T0S1, T0S7 and T0S8 it is seen that none of these conductors goes low when shifts of 0, 4, 8 or 12 positions are specified.

Assume now that at least one of the inputs to each of gates 101–105 is low, and that a pulse does appear on conductor 10T0 when the first clock pulse is applied to conductor CT0 by pulser 1000. If conductor A0 is high gate 106 operates and conductor T0S1 goes low. If both conductors A1 and D1 are high, or all three of conductors A1, C1 and E1 are high the respective one of gates 107 and 108 is operated, and conductor T0S7 goes low. Similar remarks apply to gates 109 and 110, and conductor T0S8. Consider, for example, that bits A1–E1 represent a shift of 17 positions, i.e., the bits on conductors A1–E1 form the binary number 10001. Conductors B1 and D1 are low and thus the output of gate 101 is high. All three of conductors B1, C1 and D1 are low and the output of gate 102 is high. Conductors C1 and D1 are low and the output of gate 103 is high. Conductors A0 and E0 are low and the output of gate 104 is high. Finally, conductor B1 is low and the output of gate 105 is high. Thus conductor 10T0 goes high when the first clock pulse is applied. However, gate 106 does not operate. Conductor A0 is low, and the output of gate 106 remains high. Conductor D1 is low and the output of gate 107 remains high. Conductor C1 is low and the output of gate 108 remains high. Since the outputs of gates 106–108 remain high a negative pulse does not appear on either of conductors T0S1 or T0S7. Conductor E0 is low and the output of gate 109 would normally be high. However, conductor T0S8 goes low because gate 110

TABLE C.—STEPS REQUIRED FOR DISPLACEMENT

| Outputs A1 B1 C1 D1 E1 | Shift No. | Number of Shifts Per Clock Pulse | | | Leads are Normally High—X=When Leads Go Low | | | | | | | | | Leads Normally Low—Leads Go High When Indicated Clock Pulses Are Applied | | | | Low Leads Go High When Indicated Clock Pulses Are Applied |
|---|---|---|---|---|---|---|---|---|---|---|---|---|---|---|---|---|---|---|
| | | | | | T0 | | | T1 | | | T2 | | | | | | | |
| | | T0 | T1 | T2 | T0S1 | T0S7 | T0S8 | T1S1 | T1S7 | T1S8 | T2S1 | T2S4 | T2S7 | T2S8 | S1 | S4 | S7 | S8 | SP or SPS |
| 0 0 0 0 0 | 0 | — | — | — | — | — | — | — | — | — | — | — | — | — | — | — | — | — | — |
| 1 0 0 0 0 | 1 | 1 | — | — | X | — | — | — | — | — | — | — | — | — | T0 | — | — | — | T0 |
| 0 1 0 0 0 | 2 | 1 | 1 | — | X | — | — | — | — | — | — | — | — | — | T0, T1 | — | — | — | T0, T1 |
| 1 1 0 0 0 | 3 | 1 | 1 | — | X | — | — | — | — | — | — | — | — | — | T0, T1 | — | — | — | T0, T1, T2 |
| 0 0 1 0 0 | 4 | 1 | — | 1 | X | — | — | — | — | — | — | — | — | — | T0 | T2 | — | — | T0, T2 |
| 1 0 1 0 0 | 5 | 1 | — | 1 | X | — | — | — | — | — | — | — | — | — | T0, T1 | T2 | — | — | T0, T1, T2 |
| 0 1 1 0 0 | 6 | — | 1 | 1 | — | — | — | X | — | — | — | — | — | — | T0 | T2 | — | — | T0, T1 |
| 1 1 1 0 0 | 7 | — | 1 | 1 | — | — | — | X | — | — | — | — | — | — | T0 | — | — | — | T1 |
| 0 0 0 1 0 | 8 | 8 | 8 | — | — | — | X | — | — | — | — | — | — | — | — | — | — | T1 | T0, T1 |
| 1 0 0 1 0 | 9 | 7 | 8 | — | — | — | X | — | — | — | — | — | — | — | — | T2 | T2 | T2 | T0, T1, T2 |
| 0 1 0 1 0 | 10 | 8 | 7 | — | — | X | — | — | — | — | — | — | — | — | — | T2 | — | — | T0, T1, T2 |
| 1 1 0 1 0 | 11 | 7 | 7 | — | — | X | X | — | — | — | — | — | — | — | — | T2 | T1 | T1 | T1, T2 |
| 0 0 1 1 0 | 12 | 8 | 8 | 4 | — | — | — | — | — | X | — | X | — | — | — | — | — | — | T0, T1 |
| 1 0 1 1 0 | 13 | 7 | 8 | 4 | — | — | — | — | — | X | X | X | — | — | — | — | — | — | T0, T1, T2 |
| 0 1 1 1 0 | 14 | 8 | 7 | 4 | — | — | — | — | X | X | — | X | — | — | — | T2 | — | — | T0, T1, T2 |
| 1 1 1 1 0 | 15 | 7 | 7 | 4 | — | — | — | — | X | X | X | X | — | — | — | T2 | T1 | T1 | T1, T2 |
| 0 0 0 0 1 | 16 | 1 | — | — | X | — | — | — | — | — | — | — | — | — | T2 | — | T1, T2 | T0, T1 | T0, T1, T2 |
| 1 0 0 0 1 | 17 | 1 | 1 | — | X | — | — | — | — | — | — | — | — | — | — | — | T0, T1 | T1 | T0, T1, T2 |
| 0 1 0 0 1 | 18 | 8 | 8 | 4 | — | — | — | — | — | X | — | X | — | — | T2 | T2 | T0 | T0, T1 | T0, T1, T2 |
| 1 1 0 0 1 | 19 | 7 | 8 | 4 | — | — | — | — | — | X | X | X | — | — | — | T2 | T0, T1 | T1, T1 | T0, T1, T2 |
| 0 0 1 0 1 | 20 | 8 | 7 | 4 | — | — | — | — | X | X | — | X | — | — | — | T2 | T0, T1 | T1 | T0, T1, T2 |
| 1 0 1 0 1 | 21 | 7 | 7 | 4 | — | — | — | — | X | X | X | X | — | — | — | T2 | T0, T1, T2 | T0, T1 | T0, T1, T2 |
| 0 1 1 0 1 | 22 | 8 | 8 | 7 | — | — | — | — | — | X | — | — | X | X | — | — | T0, T1, T2 | T2 | T0, T1, T2 |
| 1 1 1 1 1 | 23 | *8 | *8 | *8 | — | — | *X | — | — | *X | — | — | — | *X | — | — | — | T0, T1, T2* | T0, T1, T2 |

*On H/HC a shift of 8 each time—On Q/QS no pulses.

operates. All of bits A1, C0 and D0 are high. The output of gate 110 goes low and a negative pulse appears on conductor T0S8. Thus in FIG. 18 conductor TS8 goes low, and on FIG. 7 a positive pulse appears on conductor S8. This positive pulse controls an eight position shift of all bits in the register. As seen in Table C if a shift of 17 positions is specified conductor T0S8 goes low when the first clock pulse is applied, resulting in conductor S8 going high.

A similar scheme is provided for deriving pulses on conductors T1S1, T1S7 and T1S8 and conductor T2S1, T2S4, T2S7 and T2S8. Shifts when the second clock pulse is applied may be inhibited if any one of gates 111–113 is operated. Even if the outputs of these gates remain high a negative pulse appears on one of conductors T1S1, T1S7 or T1S8 only if the second one of the inputs to one of gates 121–123 goes high. Continuing with the example above where a shift of 17 positions is specified, from Table C it is seen that conductors C1 and D1 are low. The output of gate 111 remains high. Conductors A0, B0 and D0 are all low and the output of gate 112 remains high. Conductor B1 is low and the output of gate 113 remains high. Consequently a positive pulse appears on conductor 10T1 when a second clock pulse is applied to conductor CT1 by pulser 1000. Conductor T1S1 remains high however. Conductor A0 is low and the output of gate 114 is high. Conductors B1, D1 and E0 are low and the output of gate 115 is high. The junction of the outputs of gates 114, and 115 is thus high, and the output of inverter gate 119 is low. This output is one of the inputs of gate 121 and conductor T1S1 remains high.

Both conductors D1 and E0 are low and the output of gate 116 remains high. Conductor C1 is low and the output of gate 117 is high. Conductors A0 and D1 are low and the output of gate 118 is similarly high. Since all three outputs are high the junction is similarly high in potential. The signal is inverted by gate 120 which applies a low input to gate 122. Conductor T1S7 also remains high. However the second input of gate 123 is high and this gate operates at this time. A negative pulse appears on conductor T1S8. (The term "negative pulse" throughout this description refers to the potential of a conductor going from a positive value to ground, since the output of the basic gate utilized in the circuit is either positive or ground.) The negative pulse on conductor T1S8 appears on conductor TS8. Inverter 207 on FIG. 7 again applies a positive pulse on conductor S8 to control the shifting of all bits in the register by eight positions. Referring to Table C it is seen that this is the desired result. When the second clock pulse T1 is applied, conductor T1S8 goes low and conductor S8 goes high.

Similar remarks apply to conductor 10T2 and the various gates on FIG. 18. Gates 151–155 prevent a positive pulse from appearing on conductor 10T2 when particular combinations of bits are specified on conductors A1–E0. However, even if a positive pulse does appear on conductor 10T2 at most one of gates 166–169 may operate, the particular gate which operates depending upon the various operations of gates 156–165. An analysis similar to those above will show that when the third clock pulse is applied, gate 166 operates to apply a negative pulse to conductor T2S1 if the shift specified is 17 positions.

The operations of the gates on FIGS. 14 and 18 may be described by a series of Boolean equations. The potentials, or bit values, on conductors T0S1, T0S7 or T0S8 may be easily defined after first defining an intermediate signal T0. T0 is the bit value on conductor 10T0. It is a 1 only if the outputs of all of gates 101–105 are high when the pulse on conductor 10T0 (represented as 10T0 in the equation) is applied. In the following expression defining T0 a number appears under each parenthesis. This number identifies the gate on FIG. 14 which contributes the respective factor to the overall expression. T0 is defined as follows:

$T0 = \underset{018}{(10T0)} \; \underset{105}{(A1 \; B1)'} \; \underset{104}{(A0 \; D0 \; E0)'} \; \underset{103}{(C1 \; D1 \; E1)'} \; \underset{102}{(B1 \; C1 \; D1)'}$
$\underset{101}{(B1 \; D1 \; E1)'}$ The signals on conductors T0S1, T0S7 and T0S8 may then be defined in terms of T0. It is to be remembered that the values of T0S1, T0S7 and T0S8 are normally 1. Each conductor goes negative in potential only when a shift of the respective number of positions is to occur when the first clock pulse is applied. In the following three expressions the number under each parenthesis again indicates the gates in which the respective factor contributing to the overall expression is formed:

$T0S1 = \underset{106}{(T0 \; A0)'}$ $T0S7 = \underset{107}{(T0 \; A1 \; D1)'} \; \underset{108}{(T0 \; A1 \; C1 \; E1)'}$ $T0S8 = \underset{110}{(T0 \; A1 \; C0 \; D0)'} \; \underset{109}{(T0 \; D0 \; E0)'}$ In a similar manner an expression for T1 may be defined. The bit values on conductors T1S1, T1S7 and T1S8 may then be defined in terms of the expression for T1:

$T1 = \underset{019}{(10T1)} \; \underset{113}{(A1 \; B1)'} \; \underset{112}{(A0 \; B0 \; D0)'} \; \underset{111}{(B0 \; C1 \; D1 \; E1)'}$ $T1S1 = \underset{114, \; 119, \; 121}{(T1 \; A0 \; B0)'} \; \underset{115, \; 119, \; 121}{(T1 \; B1 \; C0 \; D1 \; E0)'}$ $T1S8 = \underset{118, \; 120, \; 123}{(T1 \; A0 \; C0 \; D1)'} \; \underset{117, \; 120, \; 123}{(T1 \; A1 \; C1 \; E1)'} \; \underset{116, \; 120, \; 123}{(T1 \; D1 \; E0)'}$ $T1S7 = \underset{122}{(T1S1 \cdot T1S8)'}$ It will be noted that once the expressions for T1S1 and T1S8 are formed they may be used for defining T1S7. On FIG. 14 the junctions of the outputs of gates 116–118 and 114–115 are used for controlling the derivation of the signals on conductors T1S1, T1S7 and T1S8.

In a similar manner expressions for T2 and then T2S1, T2S4, T2S7 and T2S8 may be defined as follows:

$T2 = \underset{020}{(10T2)} \; \underset{154}{(A0 \; C0 \; D0)'} \; \underset{152}{(A0 \; B0 \; C0 \; E0)'} \; \underset{153}{(C0 \; D0 \; E0)'}$
$\underset{151}{(A1 \; C1 \; D1 \; E1)'} \; \underset{155}{(A1 \; B1)'}$ $T2S1 = \underset{157, \; 163, \; 166}{(T2 \; A0 \; B0 \; C0)'} \; \underset{156, \; 163, \; 166}{(T2 \; C0 \; D0)'}$ $T2S7 = \underset{160, \; 164, \; 168}{(T2 \; A1 \; C1 \; E1)'} \; \underset{159, \; 164, \; 168}{(T2 \; B1 \; C1 \; D1)'} \; \underset{158, \; 164, \; 168}{(T2 \; C1 \; D1 \; E1)'}$ $T2S8 = \underset{162, \; 165, \; 169}{(T2 \; A0 \; C0 \; E0)'} \; \underset{161, \; 165, \; 169}{(T2 \; A1 \; C1 \; D1)'}$ $T2S4 = \underset{167}{(T2S1 \cdot T2S7 \cdot T2S8)'}$ The expression for T2S4 is simplified because the signals used for deriving the values of all of T2S1, T2S7 and T2S8 are used for deriving the value of T2S4. This may be seen on FIG. 18 where each of the signals T2S1, T2S7 and T2S8 is applied as one of the inputs of gate 167.

Gates 209 and 210 on FIG. 18 are provided for controlling three successive shifts of eight positions each if a 23-position shift order, as distinguished from the two rotate orders, is specified. Referring to Table C it will be recalled that if a shift of 23 positions is specified three shifts of eight positions each occur in the execution of the order. But if the order is to rotate in either the normal or abbreviated mode, no action takes place. A shift of 23 positions is specified by the binary number 10111. Thus all of conductors A1, B0, C1, D1, and E1 (five of the seven inputs of gate 209), are high. Conductor HC is high only on shift orders as described above. Conductors 10T0N, 10T1N and 10T2N are all normally high, and thus the output of gate 210 is normally low. However when a clock pulse is applied one of these three conductors goes low and the output of gate 210 goes high. Thus if a shift order is given, and the number of positions specified is 23, the normally high output of gate 209 goes low on each of the three clock pulses. The output of gate 209 is connected directly to conductor TS8, and thus a negative pulse appears on this conductor with the application of each clock pulse to control three successive shifts of eight positions each as desired.

The purpose of the circuitry on FIGS. 14 and 18 is to provide positive going pulses on conductors S1, S4, S7 and S8 on FIG. 7. A pulse appears on at most one of these conductors when each of the three clock pulses is applied. Gates 211–218, 221 and 224 on FIG. 7 control the energization on the SP and SPS conductors. It will be recalled that before any bit may be written into a register stage the respective SP or SPS conductors must go high, the bit being written at the termination of the pulses. On shift or normal rotate orders all stages of the register have bits written into them. Consequently on these orders both the SP and SPS leads are energized. On abbreviated rotate orders only the SP leads, connected to stages 6–21, are energized. Conductors S1, S4, S7 and S8 on FIG. 7 are normally low. The outputs of all of gates 211–218 are thus normally high. Inverters 221 and 224 thus normally provide ground potentials on conductors SP and SPS. When any one of conductors S1, S4, S7 or S8 goes high the output of one of gates 211–214 goes low. The junction is thus low and the SP conductor goes high. Thus when any shift occurs, no matter what the order, a positive pulse is applied to conductor SP; stages 6–21 may have bits written into them on any type of order.

Each of gates 215–218, in addition to having one of conductors S1, S4, S7 and S8 connected to one of its inputs, has one of its inputs connected to the Q conductor. Referring to Table A it is seen that this conductor is high on rotate and shift orders, and it is low on abbreviated rotate orders. Thus on abbreviated rotate orders one input of each of gates 215–218 is low and all of the outputs are high. Conductor SPS remains low even if a positive pulse appears on one of conductors S1, S4, S7 or S8. On abbreviated rotate orders stages 0–5 and 22, to which the SPS conductor is connected, cannot have bits written into them. However on rotate and shift orders when the Q conductor is high, one of gates 215–218 may operate if the respective one of conductors S1, S4, S7 or S8 is high. On rotate and shift orders a positive pulse appears on conductor SPS whenever a shift occurs during the application of a clock pulse.

Before proceeding to the description of FIGS. 8, 9, 11–13 and 15–17, the circuitry which controls the writing of bit values into the register stages, a review of the various signals controlling the operation of this circuitry will be helpful. The potentials on conductors K000–K220 represent the bit values in the 23 respective register stages. These conductors control the operations of the gates on the above figures, the gates in turn applying potentials to conductors N000–N221 which control the writing of bit values into the register stages. A positive pulse appears on the SP conductor whenever a shift is to take place, i.e., whenever a positive pulse appears on one of conductors S1, S4, S7 and S8. A positive pulse appears on conductor SPS only if the circuit is operating in the shift or normal rotate mode. The positive pulse on one of conductors S1, S4, S7 or S8 controls the magnitude of the shift during the application of each clock pulse. On FIG. 10 conductors HL and HR control the writing of 0's into the end stages of the register whenever a shift order, as distinguished from either rotate order, is executed. The complementary signals on conductors QSA and QSN distinguish between an abbreviated rotate order, and either a shift or normal rotate order. Finally, the potentials of conductors (H+Q)L and (H+Q)R indicate whether the shifting of the bits in the register is to the right or the left.

As mentioned above the circuitry of FIGS. 8, 9, 11–13 and 15–17 controls the writing of bits into the register stages. These figures may be best understood by considering FIGS. 11 and 15 separately from the others. Each of the other figures includes gates which apply the complementary signals to the N–0 and N–1 conductors for writing the bit values into the various register stages. The circuits on FIGS. 11 and 15 derive signals which feed into the gates on the other figures. The signals derived on FIGS. 11 and 15 may be called "destination signals." These destination signals are derived from the signals on the K000–K220 conductors, and from the signals on the QSA, QSN, (H+Q)L and (H+Q)R conductors. The destination signals are combined in FIGS. 8, 9, 12, 13, 16 and 17, together with HR, HL, S1, S4, S7 and S8 signals, to produce the writing signals on the N–0 and N–1 conductors.

Figure 11:
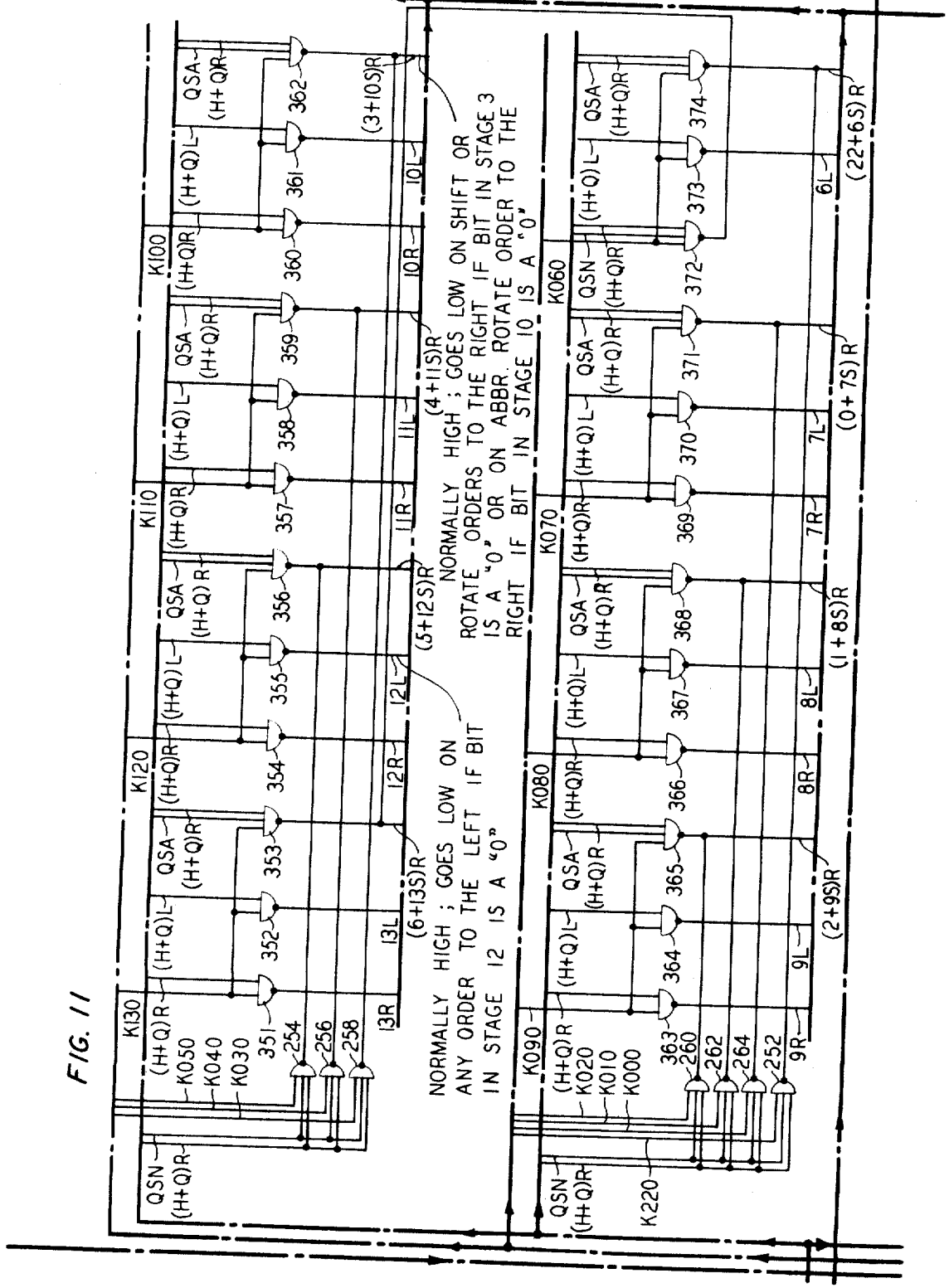
Figure 15:
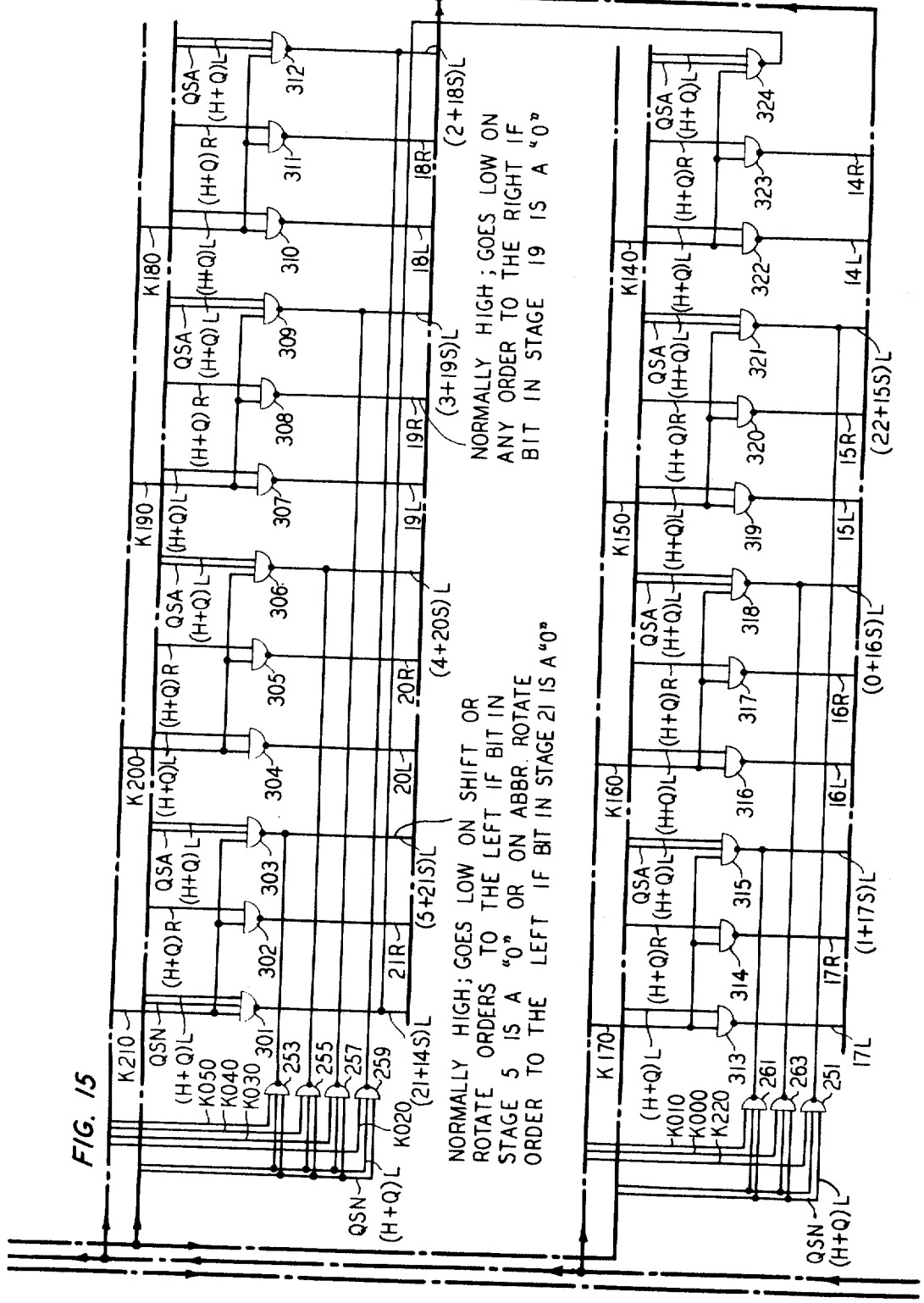

In the following analysis of FIGS. 11 and 15 no differentiation is made between shift and normal rotate orders. In fact, the destination signals are derived without taking into account the fact that 0's must be written in the end stages of the register on shift orders. As far as FIGS. 11 and 15 are concerned shift and normal rotate orders are treated alike. On a shift order either the HL or HR conductor is low and 0's will be written into the stages at one end of the register, as will be described below. The destination signals are derived however in the same manner for both shift and rotate orders. In FIGS. 11 and 15 the only distinction between the various orders is that made between abbreviated rotate orders on the one hand, and shift and normal rotate orders on the other.

The destination signals are of the form $(3+10S)R$, or $10L$. The latter signal is interpreted as follows: the signal is normally high and remains high if a shift order, as distinguished from an abbreviated rotate order, to the left is being executed, and the bit in stage 10 of the register is a 1. The expression $(3+10S)R$ is interpreted as follows: the destination signal is normally high and remains high if the bit in stage 3 is a 1 and a shift order to the right is being executed, or the bit in stage 10 is a 1 and an order to shift to the right in the abbreviated rotate mode is being executed. An S in a destination signal following the number of a stage limits the control of the respective signal by that stage to those instances in which an abbreviated rotate order is being executed. An L or R following a stage number or a parenthesis indicates that the control of the respective conductor is limited to shifts in either the left or right direction.

The reason for deriving destination signals in this manner is the following. Consider the signal $(3+10S)R$. Referring to FIG. 5 it is seen that the bit in stage 3 may be written into stages 2, 22, 19 or 18 on shift or rotate orders to the right (except that in shift orders it is blocked from stages 22, 19 and 18). On abbreviated rotate orders to the right, the bit in stage 10 may be written into stages 9, 6, 19 and 18. The signal on the lead $(3+10S)R$ represents the bit value in either stage 10 or stage 3 on any order where the shifting is to the right, the bit in stage 3 controlling the signal on shift and rotate orders, and the bit in stage 10 controlling the signal on abbreviated rotate orders. Conductor $(3+10S)R$ is extended to the various gates which control the writing of bits into stages 2, 22, 19 and 18. These are all the stages into which the bit in stage 3 may be written on orders where the shifting is to the right. On abbreviated rotate orders to the right, the bit in stage 10 may also be written into stages 18 and 19. The bit to be written into stages 18 and 19 may come from neither of stages 3 and 10, or from one of them, but obviously never from both for any one order. In executing different orders the bit value may come from one of these two stages so it is convenient to connect both of them to the writing gates for stages 18 and 19, but to control the signal on conductor $(3+10S)R$ in accordance with either the bit in stage 3 or the bit in stage 10 depending on the type of order. A single conductor is thus used to transmit appropriate writing information not only for more than a single stage, but *from* more than a single stage as well. In addition to stages 18 and 19 the bit in stage 10 is directed via conductor (3+10S)R on abbreviated rotate orders to the writing gates for stages 2 and 22. It will be recalled that on abbreviated rotate orders the SPS conductors for these stages are not pulsed. Consequently, on abbreviated rotate orders the bit in stage 10 has no effect on these stages.

The bit in stage 10 may also control the writing into stages 9 and 6 on abbreviated rotate orders, and the writing into stages 9, 6, 3 or 2 on right shift or rotate orders. Another destination signal is provided for these purposes. Conductor 10R, the signal on which is controlled by the bit value in stage 10, controls the writing of bits into stages 9, 6, 3 and 2. Stages 9 and 6 may be written into on shift, normal rotate, and abbreviated rotate orders to the right, and consequently the destination signal on conductor 10R controls the writing of the bit in stage 10 into stage 9 or 6 on any order, including an abbreviated rotate order. It also controls the writing into stage 3 or 2 on shift or normal rotate orders to the right when the SPS conductors are pulsed as well as the SP conductors. Thus only two conductors (3+10S)R and 10R, are required to transmit the two bits in stages 3 and 10 to the writing gates of all the four and six respective stages into which bits may be written on orders where the shifting is to the right. The particular writing gates which operate depend on the pulsing of one of conductors S1, S4, S7 or S8.

Table D shows the stages controlled by each of the destination signals when the shifting is to the right. The right-hand column "Stage Destination" indicates the stages whose bit values may be controlled by the associated "Destination Signal" in the left-hand column. Each destination signal of course controls the writing of a bit into only one of the four associated states. The particular one of the four is determined by the pulse on one of the conductors S1, S4, S7 or S8. Table E is interpreted in the same manner, and shows the destinations of the various signals derived on FIGS. 11 and 15 on any order where the shifting is to the left.

| TABLE D | | TABLE E | |
|---|---|---|---|
| Right Shift, Rotate or Abbreviated Rotate | | Left Shift, Rotate or Abbreviated Rotate | |
| Destination Signal | Stage Destination | Destination Signal | Stage Destination |
| (22+6S)R | 21,18,15,14 | 6L | 07,10,13,14 |
| (0+7S)R | 22,19,16,15 | 7L | 08,11,14,15 |
| 7R | 06,03,00,22 | 8L | 09,12,15,16 |
| (1+8S)R | 00,20,17,16 | 9L | 10,13,16,17 |
| 8R | 07,04,01,00 | 10L | 11,14,17,18 |
| (2+9S)R | 01,21,18,17 | 11L | 12,15,18,19 |
| 9R | 08,05,02,01 | 12L | 13,16,19,20 |
| (3+10S)R | 02,22,19,18 | 13L | 14,17,20,21 |
| 10R | 09,06,03,02 | 14L | 15,18,21,22 |
| (4+11S)R | 03,00,20,19 | 15L | 16,19,22,00 |
| 11R | 10,07,04,03 | (22+15S)L | 00,03,06,07 |
| (5+12S)R | 04,01,21,20 | 16L | 17,20,00,01 |
| 12R | 11,08,05,04 | (0+16S)L | 01,04,07,08 |
| (6+13S)R | 05,02,22,21 | 17L | 18,21,01,02 |
| 13R | 12,09,06,05 | (1+17S)L | 02,05,08,09 |
| 14R | 13,10,07,06 | 18L | 19,22,02,03 |
| 15R | 14,11,08,07 | (2+18S)L | 03,06,09,10 |
| 16R | 15,12,09,08 | 19L | 20,00,03,04 |
| 17R | 16,15,10,09 | (3+19S)L | 04,07,10,11 |
| 18R | 17,16,11,10 | 20L | 21,01,04,05 |
| 19R | 18,17,12,11 | (4+20S)L | 05,08,11,12 |
| 20R | 19,18,13,12 | 21L | 22,02,05,06 |
| 21R | 20,19,14,13 | (5+21S)L | 06,09,12,13 |

Before the operation of the circuitry on FIGS. 8, 9, 12, 13, 16 and 17 is described a few examples illustrating the derivation of the destination signals will be helpful in understanding the invention. Consider for example destination signal conductor (3+10S)R on FIG. 11. This conductor is connected to the outputs of both gates 362 and 258. Conductor (H+Q)R is normally low in potential and the output of gate 258 is therefore normally high. When a shift or rotate order, as distinguished from an abbreviated rotate order is executed, conductor QSN is high. Thus on a shift or normal rotate order to the right, both conductors QSN and (H+Q)R are high. The third input to gate 258 is conductor KO30. This conductor is high if the bit value in stage 3 of the register is a 0. Thus the output of gate 258 is normally high, but goes low whenever a shift or normal rotate order to the right is executed if the bit in stage 3 of the register is a 0. When the output of conductor 258 goes low destination signal (3+10S)R goes low. Consider now gate 362. The output of this gate is also normally high since conductor (H+Q)R is normally low. This conductor goes high when the shifting is to the right. Conductor QSA is high only on abbreviated rotate orders. The third input to gate 362 is conductor K100 which is high only if the bit value in stage 10 of the register is a 0. Thus the output of gate 362 goes low only on abbreviated rotate orders to the right if the bit in stage 10 is a 0. The outputs of gates 258 and 362 are both normally high. The signal on conductor (3+10S)R is thus normally high, and may go low under the control of either gate 258 or 362. The output may go low due to the action of only one of these two gates at any time because only one of conductors QSA or QSN, each connected to a different one of the two gates, may be high at any time. Thus destination signal (3+10S)R is normally high, and goes low only if an abbreviated rotate order to the right is being executed and the bit in stage 10 is a 0, or a shift or normal rotate order to the right is being executed and the bit in stage 3 is a 0.

Consider next destination signal conductor 12L. Conductor (H+Q)L is normally low and conductor 12L is thus normally high. This conductor goes low on any type of order when the shifting is to the left if the bit in stage 12 of the register, whose respective conductor K120 is the second input of gate 355, is a 0.

Consider now destination signal conductor (5+21S)L on FIG. 15. The output of gate 303 is normally high because input conductor (H+Q)L is normally low, and the output of gate 253 is normally high because its input conductor (H+Q)L is again low. Thus destination signal (5+21S)L is normally high, and goes low only if the output of one of gates 303 or 253 goes low. Gate 253 operates if its three input leads all go high. Conductor QSN goes high on shift and normal rotate orders. Conductor (H+Q)L goes high on any order where the shifting is to the left. Conductor K050 is high only if the bit in stage 5 of the register is a 0. Thus destination signal (5+21S)L is low whenever a shift or normal rotate order to the left is executed if the bit in stage 5 of the register is a 0. Similarly, the output of gate 303 goes low if its three input conductors are all higher. Conductor (H+Q)L is) high on any order if the shifting is to the left. Conductor QSA is high only when an abbreviated rotate order is being executed. Conductor K210 is high if the bit in stage 21 is a 0. Thus gate 303 controls destination signal (5+21S)L to go low whenever an abbreviated rotate order to the left is executed if the bit in stage 21 is a 0.

As a final example consider destination signal conductor 19R on FIG. 15. Gate 308 has only two inputs, conductors (H+Q)R and K190. Thus conductor 19R goes low whenever an order in which the shifting is to the right is executed provided the bit in stage 19 of the register is a 0.

The destination signal on each of the similarly labeled output conductors on FIGS. 11 and 15 may be determined in a like manner. All of the destination signals are normally high, i.e., they normally represent binary 1's. Some of the destination signals are controlled by the bit value in only one stage of the register, on any order where the shifting is either to the left or to the right. Destination signals 10L and 19R are exemplary. The other destination signals are controlled by bit values in either one of two register stages. If the bit in the first stage is a 0 on a shift or normal rotate order and the shifting is in a particular one of the two directions, the destination signal is a 0. If the bit in the other stage is a 0 and an abbreviated rotate order in the same direction is being executed, the destination signal is again low. These combined destination signals may be controlled by the value in only one of the two specific register stages, depending on whether a shift or normal rotate order is being executed, as distinguished from an abbreviated rotate order. As seen in Tables D and E the destination signal conductors are used in determining the bit values to be written into the register stages. Each destination signal conductor is an input of a writing gate for four different stages. Which one of the four gates actually controls the writing of a bit in the respective stage depends on whether the shift taking place is 1, 4, 7 or 8 positions. Furthermore, on shift orders the HR or HL conductors control the writing of 0's into the end stages of the register no matter what the values of the various destination signals extended to each group of writing gates on FIGS. 8, 9, 12, 13, 16 and 17.

The operation of the writing gates may be understood by considering a typical example. Gates 401–404 and 417 on FIG. 8 control the writing of the bit into stage 22 of the register (provided the SPS conductors are pulsed). If a shift order to the right is being executed conductor HR is low. This conductor is one input of each of gates 401–404. Consequently on a right shift, the output of each of these four gates is high. Conductor N220 is high and conductor N221 is low. As seen in FIG. 25C these are the signals required to write a 0 into stage 22 of the register. The SPS conductors connected to stage 22 of the register are pulsed on every shift order, i.e., whenever conductor HL or HR goes low, because as seen in Table A when a shift order is executed the Q bit is a 1. The Q bit controls the pulsing of conductor SPS on FIG. 7, and a 0 may be written into stage 22.

The output of only one of gates 401–404 can go low at any instant. Each of the S1, S4, S7 and S8 conductors is an input of a different one of these four gates. These conductors are normally low and the outputs of all the gates are therefore normally high. Since only one of the S1, S4, S7 and S8 conductors may go high at any time only one of the four gate outputs may go low. One of these four conductors goes high, and only if the other inputs to the same gate are high does the output go low. When the output goes low conductor N220 is low and conductor N221 is high. When the SPS pulse terminates a 1 is written into stage 22 of the register.

Assume that a shift order to the right is not being executed, and that therefore a 0 should not necessarily be written in stage 22. Conductor HR is high and therefore does not control the automatic writing of a 0 into stage 22. The bit in stage 22 remains unchanged if an abbreviated rotate order is executed because the SPS conductor is not pulsed. For this reason, if a bit (other than an automatic 0 on a right shift order) is to be written into stage 22, the order being executed must be either a left shift, or a left or right rotation. As far as stage 22 is concerned there is no difference between a left shift and a left rotation. In either case if the shift is of one position the bit in stage 21 must be written into stage 22. Similarly, if the shift is of 4, 7, or 8 positions, the bits in respective stages 18, 15 and 14 must be written into stage 22.

Assume that the shift is of eight positions and that of conductors S1, S4, S7 and S8, only S8 is high. Gates 402–404 are not operated. Three of the inputs to gate 401 are high. Conductor HR is high because this conductor goes low only on a right shift. Conductor S8 is high because a shift of eight positions is taking place. Destination signal conductor 7R is high because this conductor goes low only when the shifting is to the right and the bit in stage 7 is a 0. Thus the output of gate 401 depends solely on destination signal 14L. This signal is low only when the shifting is to the left and the bit in stage 14 is a 0. If the bit in stage 14 is a 0 the output of gate 401 is high and a 0 is written into stage 22 because the outputs of all of gates 401–404 are high. If however the bit in stage 14 is a 1 destination signal 14L is high, all four inputs of gate 401 are high, and the output is low. Conductor N220 is low, conductor N221 is high, and a 1 is written into stage 22. Thus on a shift of eight positions to the left the bit in stage 14 is written directly into stage 22.

Similarly, if the shift to the left is of seven positions gate 402 controls the writing of the bit into stage 22. The outputs of gates 401, 403 and 404 are their usual high. Three of the inputs, HR, S7 and (6+13S)R, to gate 402 are high. Gate 402 goes low only if conductor 15L is high. Thus a 1 is written into stage 22 of the register only if a 1 is in stage 15 of the register prior to the shift. If a 0 is in stage 15, a 0 is written into stage 22 at the termination of the SPS pulse. Similar remarks apply to gate 403. On any shift to the left of four positions the bit in stage 18 is transferred to stage 22.

On a shift to the left of only one position three of the inputs to gates 404, conductors HR, S1 and (0+7S)R, are high. The fourth input, conductor (21+14S)L is normally high and goes low on either of two conditions; the bit in stage 21 is a 0 on any order when the shifting is to the left, or the bit in stage 14 is a 0 on an abbreviated rotate order to the left. If an abbreviated rotate order to the left is being executed and the potentials on conductors N220 and N221 are controlled in accordance with the bit in stage 14, stage 22 remains unchanged because the SPS conductor is not pulsed. The SPS conductor is pulsed only on shift and normal rotate orders. If a left shift or rotate order is being executed the bit in stage 21 controls destination signal (21+14S)L. If this bit is a 0, a 0 is written into stage 22; if it is a 1, a 1 is written into stage 22. In effect, the 14S part of destination signal (21+14S)L is never used as far as stage 22 is concerned because whenever the bit in stage 14 controls the potentials of conductors N220 and N221 stage 22 remains unchanged because the SPS conductor is not pulsed to begin with. It would be sufficient to provide a destination signal of the form 21L as an input to gate 404, rather than destination signal (21+14S)L. Destination signal (21+14S)L is required however for others of the writing gates. Rather than form a separate destination signal 21L, destination signal (21+14S)L may be used because the 14S part of the signal may exert no control on stage 22. The 14S part of the signal controls the signal value only on abbreviated rotate orders, and when such orders are executed the bit in stage 22 remains unchanged becaused the SPS conductor is not pulsed.

Thus far the writing of bits into stage 22 on any order where the shifting is to the left, and on shift orders (as distinguished from either of the rotate orders) to the right have been considered. The only remaining types of orders to be considered are normal rotate and abbreviated rotate orders to the right. It will be noted that destination signals (6+13S)R, (3+10S)R and (0+7S)R are each an input of one of gates 402–404. Thus the outputs of these gates may be controlled by the bits in respective stages 13, 10 and 7 on abbreviated rotate orders. Although the complementary signals on conductors N220 and N221 may thus be controlled by these bit values on abbreviated rotate orders, the bits have no effect on stage 22 because conductor SPS is not pulsed when an abbreviated rotate order is executed. The remarks directly above concerning destination signal (21+14S)L on abbreviated rotate orders apply to destination signals (6+13S)R, (3+10S)R and (0+7S)R.

Thus the only time a bit in another stage of the register controls the writing of a bit into stage 22 on an order where the shifting is to the right is when a normal rotate order to the right is being executed. At this time the four HR inputs to gates 401–404 are all high. Similar remarks apply to the four inputs 14L, 15L, 18L and (21+14S)L. Only one of conductors S1, S4, S7 and S8 is high, and thus only one of gates 401–404 controls the writing of a bit value into stage 22. If the shift to the right is of eight positions only conductor S8 of these four conductors is high. When the shift is eight positions to the right the bit in stage 7 controls the bit written into stage 22. If stage 7 contains a 0 conductor 7R is low, the output of gate 401 is high, and since the outputs of gates 402–404 are also high, a 0 is written into stage 22. If on the other hand the bit in stage 7 is a 1 conductor 7R is high and since the other three inputs of gates 401 are high its output is low. A 1 is thus written into stage 22.

If a normal rotate order to the right is executed where the shifting is of seven positions gate 402 controls the writing of the bit into stage 22. Three of the inputs of gate 402 are high, and destination signal (6+13S)R determines the value of the bit written into stage 22. In a normal rotate order to the right, destination signal (6+13S)R is determined by the bit in stage 6, rather than the bit in stage 13. If the bit in stage 6 is a 1 the destination signal is high and a 1 is written into stage 22. If the bit in stage 6 is a 0 the destination signal is low and a 0 is written into stage 22. Similar remarks apply to shifts of 4 and 1 positions to the right on normal rotate orders, designation signals (3+10S)R and (0+7S)R, and the values of the bits in stages 3 and 0.

Figure 8:
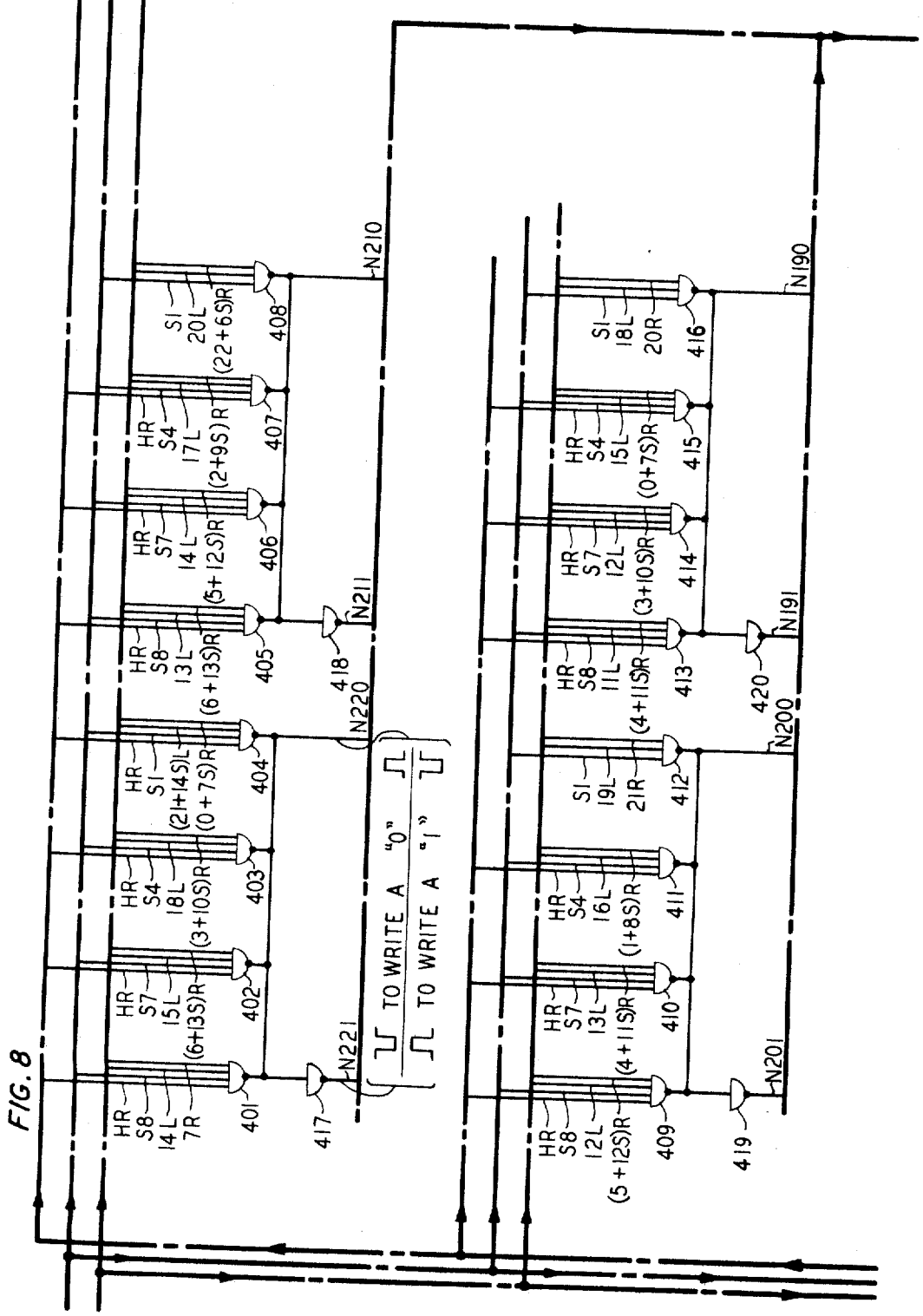

The gates for controlling the writing of bits into stages 21, 20 and 19 also appear on FIG. 8. These three individual groups of gates are similar to the group just considered which controls the writing of a bit into stage 22. There is one difference however. The HR conductor is an input to only three of the four gates in each group. Gates 408, 412 and 416, which are the gates controlling the writing of bits into respective stages 21–19 on any order where the shifting is of one position only, do not have the HR conductor as an input. It will be recalled that the HR conductor controls the automatic writing of a 0 into the left end stages of the register when a shift order to the right, as distinguished from both of the rotate orders, is being executed. As far as stage 22 is concerned a 0 must be written when a shift to the right of any magnitude occurs. However, 0's should be written automatically into stages 21–19 only if the shift to the right is of at least four positions. Consequently, gates 408, 412 and 416, which control the writing of bits into respective stages 21–19 on shifts of only one position, do not have HR inputs. If the register word is being shifted only one position to the right a 0 should be written only into stage 22. The bits to be written into stages 21–19 should be determined by the bit values previously found in other respective ones of the stages. The bit in stage 22 determines the bit written into stage 21, the bit in stage 21 determines the bit written into stage 20, and the bit in stage 20 determines the bit written into stage 19. The operations of the writing gates for stages 21–19 are in all other respects similar to the operation of the writing gates for stage 22. For example, on a right shift of three positions (three successive jumps of one position each) on each jump the HR conductor controls the writing of a 0 into stage 22. The 0 written into this stage on the first jump is transferred to stage 21 in the usual manner during the second jump. On the third jump the HR signal again controls the writing of a 0 in stage 22. The 0's previously in stages 22 and 21 are transferred in the normal manner to respective stages 21 and 20.

Figure 12:
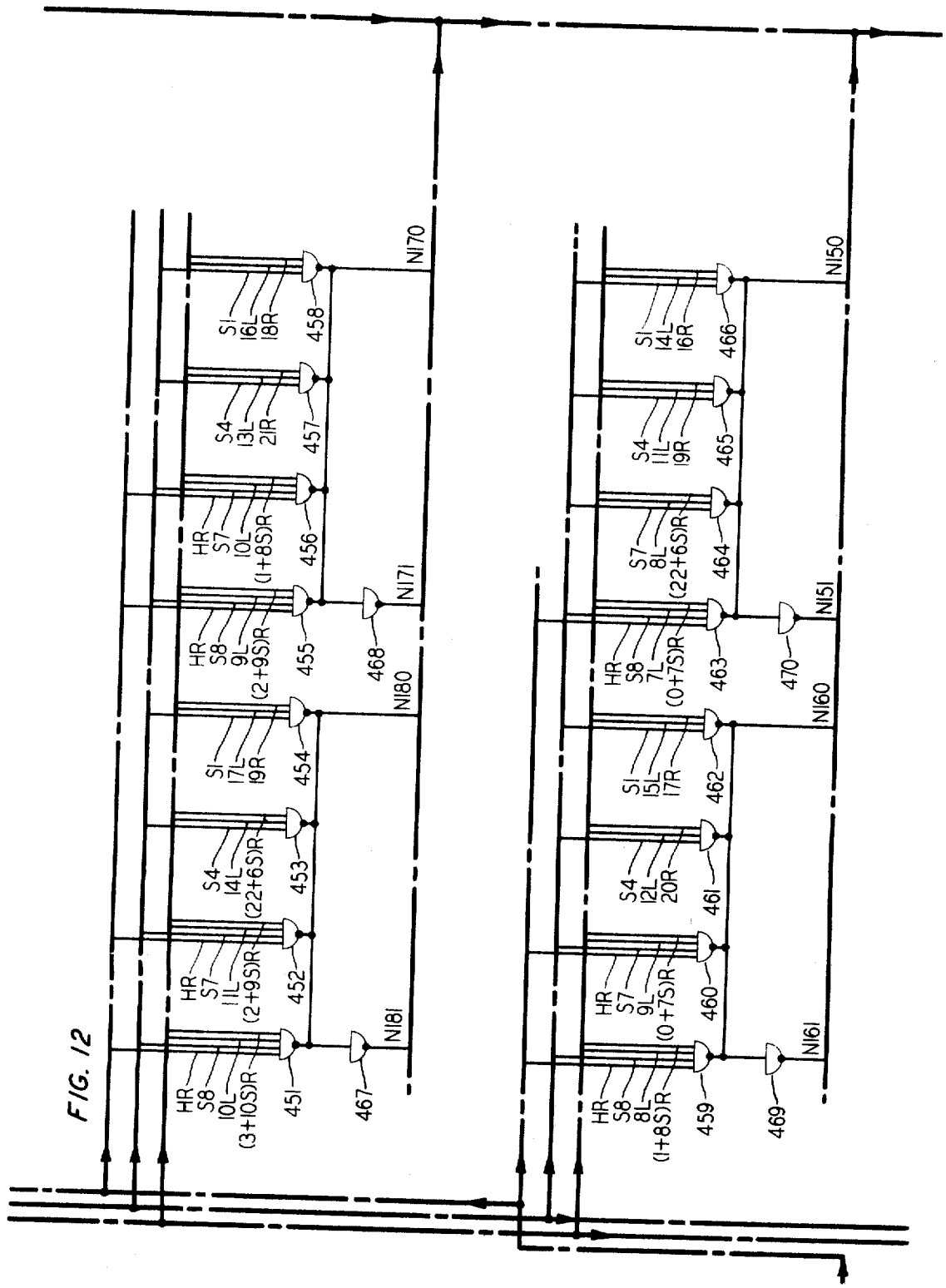

Consider next the writing gates for stages 18, 17 and 16 on FIG. 12. These gates operate in a manner similar to that of the gates on FIG. 8. It is now seen that the gate in each group of four which controls the writing of a bit in the respective stage on a shift of four positions also does not have an HR input. If a shift of four positions is specified when the order being executed is a right shift 0's should be written automatically into stages 22–19, the four leftmost stages of the register. 0's should not be written automatically into stages 18–16. 0's should be written into these stages only when shifts of seven or eight positions are specified on right shift orders. For this reason the HR signal is an input to only the two gates in each group which control the writing of bits into the respective stages when the shift specified is of seven or eight positions.

Similar remarks apply to the writing gates of stage 15 but it will now be observed that the HR conductor is an input to only one of the four gates. On shifts of 1, 4 or 7 positions to the right, on a shift order, 0's should be written automatically only into either stage 22, stages 19–22, or stages 16–22. A 0 should be written into stage 15 only when a shift of eight positions to the right, on a shift order, is specified. For this reason the HR conductor is an input to only gate 463 of the group 463–466. The four groups of writing gates for stages 11–14 on FIG. 16 have neither HR nor HL inputs. Stages 11–14 never have 0's written into them as a matter of course on shift orders in either direction. Each of the gates has only three inputs. As an example illustrating the operation of the writing gates consider those controlling the writing of the bit into stage 14. Bits may be written into stage 14 on any one of the three types of orders where the shifting is in either direction. Table F shows the stage whose bit controls the value of the bit written into stage 14 on each of the six possible order-direction combinations. The bit in a different stage controls the value of the bit written into stage 14 depending on which shift magnitude is specified.

TABLE F

| Order | Direction of Shift | Stage Whose Bit Controls Value of Bit Written Into Stage 14 Shift Magnitude Specified | | | |
|---|---|---|---|---|---|
| | | 1 | 4 | 7 | 8 |
| Shift | Left | 13 | 10 | 7 | 6 |
| Rotate | do | 13 | 10 | 7 | 6 |
| Abb. Rotate | do | 13 | 10 | 7 | 6 |
| Shift | Right | 15 | 18 | 21 | 22 |
| Rotate | do | 15 | 18 | 21 | 22 |
| Abb. Rotate | do | 15 | 18 | 21 | 6 |

For example, consider a shift order where the left direction is specified. If the magnitude of the shift is one position the bit in stage 13 is written into stage 14, and if it is four positions the bit in stage 13 is written into stage 14. If it is seven positions the bit in stage 7 is written into stage 14, and if it is eight positions, the bit in stage 6 is written into stage 14. There is no difference between shift, rotate and abbreviated rotate orders to the left as far as stage 14 is concerned. Stages 6–13 are all of the stages included within the stages in which abbreviated rotate orders are executed. Consequently the three uppermost rows of Table F are alike. On shift and rotate orders to the right the bit in stage 15 is written into stage 14 if the shift magnitude specified is only one position. The bit in stage 18 controls if a shift or four positions is specified, and the bits in stages 21 and 22 control if respective shifts of seven and eight positions are to occur. When an abbreviated rotate order to the right is executed however there is a slight modification. Stages 15, 18 and 21 are within stages 6–21, the stages in which abbreviated rotation takes place. Consequently, if a shift magnitude of 1, 4 or 7 positions is specified the stage whose bit controls the value of the bit written into stage 14 is again one of respective stages 15, 18 and 21. If a shift of eight positions is specified when an abbreviated rotate order to the right is executed however, the bit in stage 6 controls the value of the bit written into stage 14, rather than the bit in stage 22. It will be noted that in the abbreviated rotate mode stage 14 is eight positions to the right of stage 6.

The operation of gates 501–504 may be understood with reference to Table F. The output of each of the gates is normally high since each of conductors S1, S4, S7 and S8 is normally low. Assume that a shift of one position is specified, and that gate 504 therefore controls the complementary signals on conductors N140 and N141. On orders where the shifting is to the left conductor 15R, as conductor S1, is high. If the bit in stage 13 is a 0, conductor 13L is low because designation signal 13L is low whenever the bit in stage 13 is a 0 and the shifting is to the left. The output of gate 504 is high and a 0 is written into stage 14. If the bit in stage 13 is a 1 all three inputs to gate 504 are high and the output is low. Conductor N140 is low and conductor N141 is high; a 1 is written into stage 14. Similarly, if the shifting is to the right, conductor 13L is high, and destination signal 15R controls the value of the bit written into stage 14. Thus as seen in Table F on all three orders where the shifting is to the left, the bit in stage 13 controls the value of the bit written into stage 14, and on all three orders where the shifting is to the right, the bit in stage 15 controls the value of the bit written into stage 14. Similar remarks apply to gate 503. As seen in the table when a shift magnitude of four positions is specified the bit in stage 10 controls the value of the bit written into stage 14 if the shifting is to the left, and the bit in stage 18 controls the value of the bit written into stage 14 if the shifting is to the right. The inputs to gate 503 are thus conductors S4, 10L and 18R.

When the register word is shifted seven positions to the left on any type of order the bit in stage 7 controls the bit written into stage 14. When a shift of seven positions to the right is specified on any type of order, as seen from Table F it is the bit in stage 21 which controls the writing of the bit into stage 14. Thus the three inputs to gate 502 are conductors S7, 7L and 21R.

Referring to Table F it is seen that when a shift of eight positions is specified the bit in stage 6 controls the value of the bit written into stage 14 on all three types of orders where the shifting is to the left, and on an abbreviated rotate order where the shifting is to the right. Destination signal 6L provides the first type of control, and the 6S part of destination signal $(22+6S)R$ provides the second type of control. On shift and normal rotate orders to the right as seen from Table F the bit in stage 22 determines the value of the bit written into stage 14. The 22 part of destination signal $(22+6S)R$ provides the required control.

Figure 9:
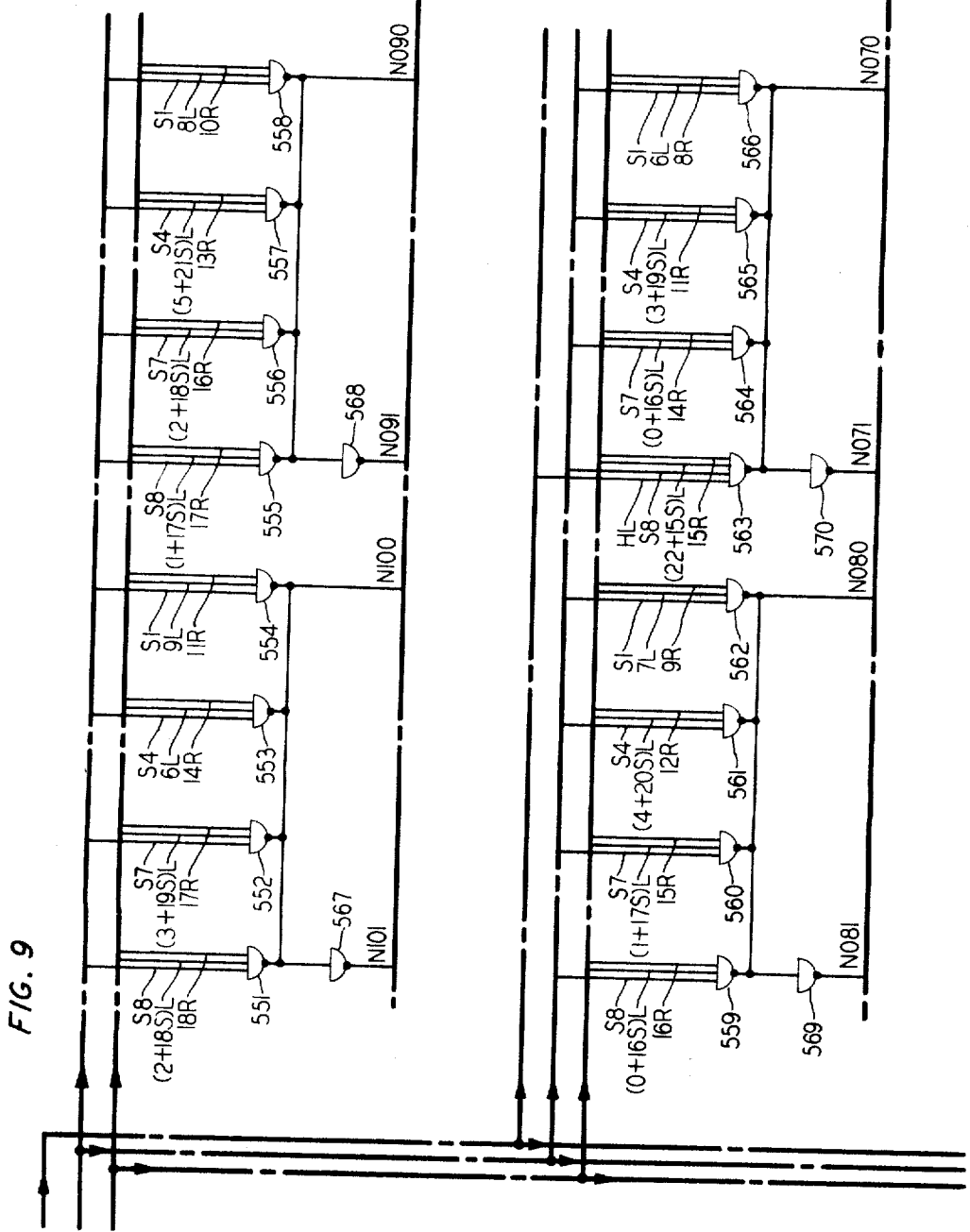
Figure 16:
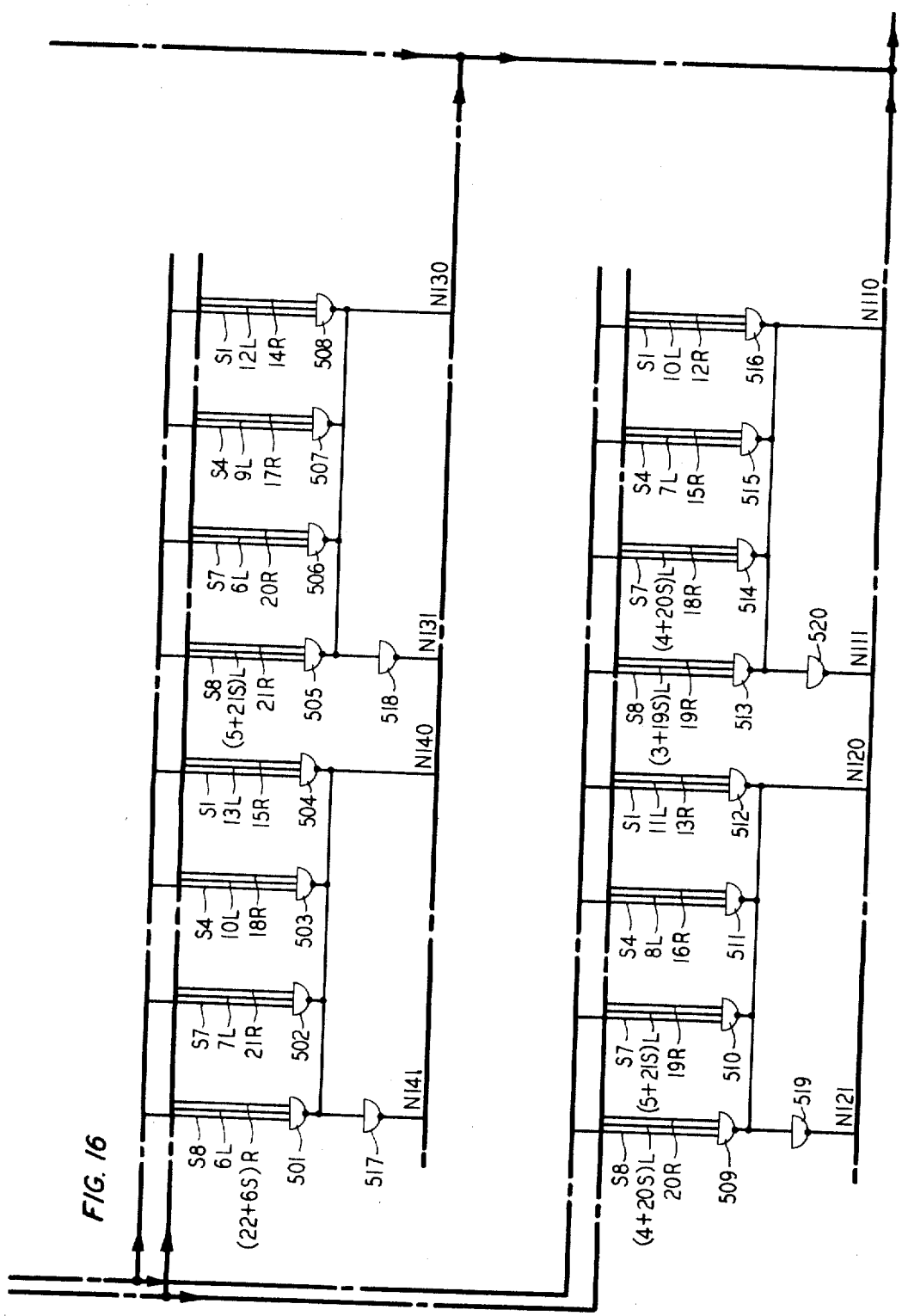

The writing gates for stages 10-8 on FIG. 9 are similar to the writing gates for stages 14-11 on FIG. 16. No HL or HR inputs are required for these stages because 0's are not automatically written into them on shift orders. However, an HL input is provided to gate 563, which controls the writing of the bit into stage 7 when the shift magnitude specified is eight positions. When a shift of eight positions to the left is specified a 0 must automatically be written into stage 7. Conductor HL is low when a shift, as distinguished from both rotate orders, to the left is executed. Thus the output of gate 563 is high, as are the outputs of gates 564–566 whose respective input conductors S7, S4 and S1 are all low. Conductor N070 is high and conductor N071 is low, and a 0 is written into stage 7. If an abbreviated rotate, normal rotate or right shift order is specified the HL conductor is high and exerts no control on gate 563 as required.

Figure 13:
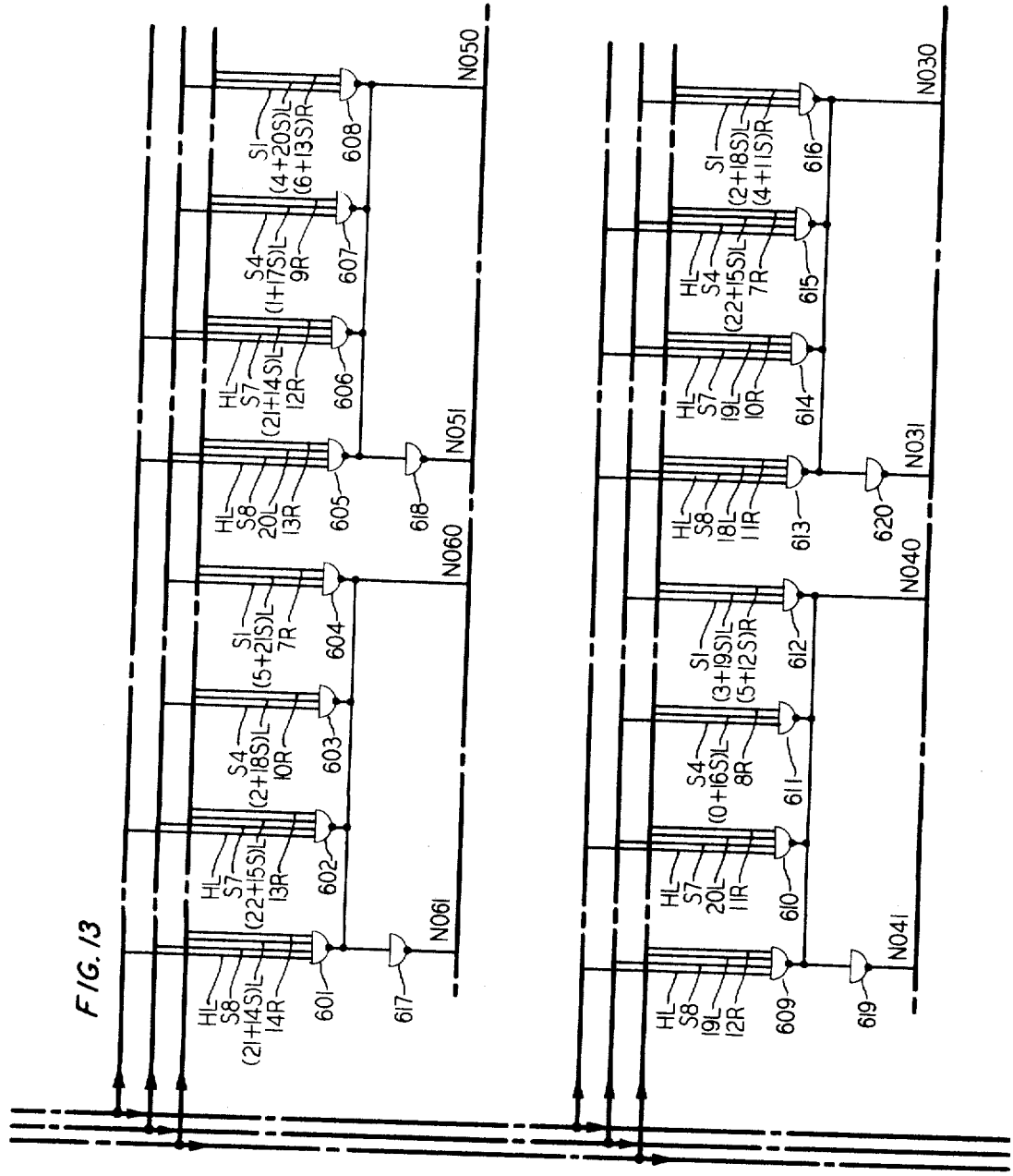

On FIG. 13 it is seen that an HL input is provided for each of two of the gates in each group of writing gates for stages 6-4. 0's must be written automatically into these stages when a left shift order is executed and the magnitude of the shift specified is seven positions, as well as eight. Similarly, the writing gates for stage 3 on FIG. 13, and stages 2 and 1 on FIG. 17 each has three HL inputs because 0's must be written automatically into these stages on left shift orders when shifts of four positions are specified, as well as shifts of seven or eight. Finally, the writing gates for stage 0 have four HL inputs because a 0 must be written into stage 0 on a left shift order when a shift of any magnitude is specified.

The signals appearing on the 46 conductors N000 through N221 may be defined by a set of Boolean equations. The signals on the 23 conductors N001 through N221 are defined in terms of the various destination signals, the S1–S8 signals, and the HL and HR signals. The signals on conductors N000 through N220 are merely the complements of the respective N001–N221 signals. In interpreting the equations it is to be remembered that all high level signals are represented by the binary number 1, and all low level signals are represented by the binary number 0. The equation defining the signal on each of the N—1 conductors may be easily determined by an inspection of the respective writing gates. The equations are included to serve as a summary of the operations of the various gates on FIGS. 8, 9, 12, 13, 16 and 17.

$N221 = HR[S8 \cdot 7R \cdot 14L + S7 \cdot (6+13S)R \cdot 15L$
$\quad + S4 \cdot (3+10S)R \cdot 18L + S1 \cdot (0+7S)R \cdot (21+14S)L]$
$N211 = HR[S8 \cdot (6+13S)R \cdot 13L + S7 \cdot (5+12S)R \cdot 14L$
$\quad + S4 \cdot (2+9S)R \cdot 17L] + S1 \cdot (22+6S)R \cdot 20L$
$N201 = HR[S8 \cdot (5+12S)R \cdot 12L + S7 \cdot (4+11S)R \cdot 13L$
$\quad + S4 \cdot (1+8S)R \cdot 16L] + S1 \cdot 21R \cdot 19L$
$N191 = HR[S8 \cdot (4+11S)R \cdot 11L + S7 \cdot (3+10S)R \cdot 12L$
$\quad + S4 \cdot (0+7S)R \cdot 15L] + S1 \cdot 20R \cdot 18L$
$N181 = HR[S8 \cdot (3+10S)R \cdot 10L + S7 \cdot (2+9S)R \cdot 11L]$
$\quad + S4 \cdot (22+6S)R \cdot 14L + S1 \cdot 19R \cdot 17L$
$N171 = HR[S8 \cdot (2+9S)R \cdot 9L + S7 \cdot (1+8S)R \cdot 10L]$
$\quad + S4 \cdot 21R \cdot 13L + S1 \cdot 18R \cdot 16L$
$N161 = HR[S8 \cdot (1+8S)R \cdot 8L + S7 \cdot (0+7S)R \cdot 9L]$
$\quad + S4 \cdot 20R \cdot 12L + S1 \cdot 17R \cdot 15L$
$N151 = HR \cdot S8 \cdot (0+7S)R \cdot 7L + S7 \cdot (22+6S)R \cdot 8L$
$\quad + S4 \cdot 19R \cdot 11L + S1 \cdot 16R \cdot 14L$
$N141 = S8 \cdot (22+6S)R \cdot 6L + S7 \cdot 21R \cdot 7L + S4 \cdot 18R \cdot 10L$
$\quad + S1 \cdot 15R \cdot 13L$
$N131 = S8 \cdot 21R \cdot (5+21S)L + S7 \cdot 20R \cdot 6L + S4 \cdot 17R \cdot 9L$
$\quad + S1 \cdot 14R \cdot 12L$
$N121 = S8 \cdot 20R \cdot (4+20S)L + S7 \cdot 19R \cdot (5+21S)L$
$\quad + S4 \cdot 16R \cdot 8L + S1 \cdot 13R \cdot 11L$
$N111 = S8 \cdot 19R \cdot (3+19S)L + S7 \cdot 18R \cdot (4+20S)L$
$\quad + S4 \cdot 15R \cdot 7L + S1 \cdot 12R \cdot 10L$
$N101 = S8 \cdot 18R \cdot (2+18S)L + S7 \cdot 17R \cdot (3+19S)L$
$\quad + S4 \cdot 14R \cdot 6L + S1 \cdot 11R \cdot 9L$
$N091 = S8 \cdot 17R \cdot (1+17S)L + S7 \cdot 16R \cdot (2+18S)L$
$\quad + S4 \cdot 13R \cdot (5+21S)L + S1 \cdot 10R \cdot 8L$
$N081 = S8 \cdot 16R \cdot (0+16S)L + S7 \cdot 15R \cdot (1+17S)L$
$\quad + S4 \cdot 12R \cdot (4+20S)L + S1 \cdot 9R \cdot 7L$
$N071 = HL \cdot S8 \cdot 15R \cdot (22+15S)L + S7 \cdot 14R \cdot (0+16S)L$
$\quad + S4 \cdot 11R \cdot (3+19S)L + S1 \cdot 8R \cdot 6L$
$N061 = HL[S8 \cdot 14R \cdot (21+14S)L + S7 \cdot 13R \cdot (22+15S)L]$
$\quad + S4 \cdot 10R \cdot (2+18S)L + S1 \cdot 7R \cdot (5+21S)L$
$N051 = HL[S8 \cdot 13R \cdot 20L + S7 \cdot 12R \cdot (21+14S)L]$
$\quad + S4 \cdot 9R \cdot (1+17S)L + S1 \cdot (6+13S)R \cdot (4+20S)L$
$N041 = HL[S8 \cdot 12R \cdot 19L + S7 \cdot 11R \cdot 20L]$
$\quad + S4 \cdot 8R \cdot (0+16S)L + S1 \cdot (5+12S)R \cdot (3+19S)L$
$N031 = HL[S8 \cdot 11R \cdot 18L + S7 \cdot 10R \cdot 19L$
$\quad + S4 \cdot 7R \cdot (22+15S)L] + S1 \cdot (4+11S)R \cdot (2+18S)L$
$N021 = HL[S8 \cdot 10R \cdot 17L + S7 \cdot 9R \cdot 18L$
$\quad + S4 \cdot (6+13S)R \cdot (21+14S)L]$
$\quad + S1 \cdot (3+10S)R \cdot (1+17S)L$
$N011 = HL[S8 \cdot 9R \cdot 16L + S7 \cdot 8R \cdot 17L$
$\quad + S4 \cdot (5+12S)R \cdot 20L] + S1 \cdot (2+9S)R \cdot (0+16S)L$
$N001 = HL[S8 \cdot 8R \cdot 15L + S7 \cdot 7R \cdot 16L$
$\quad + S4 \cdot (4+11S)R \cdot 19L + S1 \cdot (1+8S)R \cdot (22+15S)L]$ It must be borne in mind that the remarks made above with reference to the writing gates for stage 22 similarly apply to the writing gates for stages 0–5. When the circuit is operating in the abbreviated rotate mode complementary signals will appear on the respective N—0 and N—1 conductors associated with each stage, the signals depending on the values of the bits in other stages of the register. For example, when a shift to the right of one position is specified in the abbreviated rotate mode, the signal at the output of gate 658 on FIG. 17 is controlled by the value of the bit in stage 9. This is due to the fact that destination signal $(2+9S)R$ includes a 9S component the destination signal going low whenever a 0 appears in stage 9 of the register and an abbreviated rotate order to the right is executed. But on an abbreviated rotate order the bit in stage 1 is to remain unchanged. Although the bit in stage 9 controls the complementary signals on conductors N010 and N011, these signals have no effect on stage 1 because the SPS conductor is not pulsed when the circuit is operating in the abbreviated rotate mode. It would be sufficient to extend a destination signal 2R to gate 658 rather than destination signal (2+9S)R. However, the latter designation signal is required, as seen from Table D, for the writing gates associated with stages 21, 18 and 17. Since the combined destination signal is available it is extended to gate 658. The 2 component of the destination signal is used to control the writing of a bit into stage 1 when shifts of one position to the right are specified on shift and normal rotate orders. The 9S part of the destination signal controls the complementary signals on conductors N010 and N011 in accordance with the bit value in stage 9 when abbreviated rotate orders to the right are specified. The signals however have no effect on stage 1 of the register whose contents remain unchanged because the SPS conductor is not pulsed on abbreviated rotate orders.

It is to be understood that the illustrative embodiment of the invention is only exemplary of the type of system which may be designed based on the principles of the invention. It is possible to design a system in which the bit in any stage is transferred to other stages which are not necessarily 1, 4, 7 or 8 positions away. Gates may be provided for example to allow the transfer of any bit from one stage to other stages 1, 2, 4, 8, etc. positions away. Similarly, while shifts in the illustrative embodiment of the invention are accomplished in at most three steps it may be possible to shift the entire register word in only one or two steps. If time limitations are not severe more than three steps may be allowed. In the illustrative embodiment of the invention destination signals are formed, and these signals are used to control the writing gates. It is possible to provide other gating schemes to accomplish the same objectives. While in the illustrative embodiment of the invention three particular types of orders may be executed, it is possible to apply the principles of the invention to systems capable of executing different types of orders. Thus it is to be understood that the illustrative embodiment of the invention is merely exemplary of the principles of the invention, and that various modifications may be made therein and other arrangements may be devised without departing from the spirit and scope of the invention.

What is claimed is:

1. A circuit for controlling the shifting of the bits contained in the stages of a register comprising
    a plurality of groups of unidirectional transmitting means, one end of each transmitting means in each group being connected to a respective one of said stages, the other end of each transmitting means in each group being connected to another respective one of said stages such that all transmitting means in each group are connected to two different stages which are separated from each other by the same number of intermediate stages,
    means for operating all of the transmitting means in any one of said groups simultaneously for transmitting the bits in all of said stages to the respective stages at the other ends of the respective operated transmitting means, and
    means for sequentially energizing said operating means in accordance with the total number of positions which the bits in said register stages are to be shifted.

2. A circuit for controlling the shifting of the bits contained in the stages of a register in accordance with claim 1 wherein said plurality comprises four groups of transmitting means, all of the transmitting means in each of said four groups being connected between stages separated respectively by one, four, seven and eight intermediate stages.

3. A control circuit for a data processor having a multistage data register and instruction means for indicating the number of positions which the bits in said register are to be shifted, said control circuit comprising a plurality of gating path means individually connecting each stage in said register to other stages in said register a predetermined number of positions away from said each stage, means for decoding the information in said instruction means, and means responsive to said decoding means for controlling the sequential operations of said gating path means in accordance with the information in said instruction means, said controlling means controlling the simultaneous operations of all gating path means connected between stages separated by the same number of stages.

4. A logic circuit for controlling the shifting of bits within the locations of a memory comprising
    means for registering a magnitude of shift,
    a plurality of gating path means connected to each location of said memory for transferring the bit in said each location to selected other locations of said memory, each of said selected other locations being one of a predetermined number of positions away from said each location,
    a plurality of means each for operating all of the gating path means which transfer the bits in respective locations to locations the same number of positions away from said respective locations, and
    means for sequentially energizing said operating means in accordance with the shift magnitude registered in said registering means.

5. A logic circuit for controlling the shifting of bits within the locations of a memory in accordance with claim 4 wherein said plurality of gating path means includes
    a first plurality of groups of gates, each group being directly connected to one of the locations in said memory for writing a bit in said one location, said plurality of operating means being directly and selectively connected to said gates in said first plurality of groups of gates, and
    a second plurality of gates selectively connected to said first plurality of groups of gates, said second plurality of gates being controlled by the values of the bits contained in said memory locations.

6. A shifting control circuit for a multistage register comprising
    a plurality of groups of gates, each group having the same number of gates and each group controlling the writing of a bit in a respective one of said register stages,
    first means for registering the type of order to be executed,
    second means for registering the magnitude of the shift to be made in executing the registered order,
    third means for registering the direction of said shift,
    a plurality of energizing means equal in number to the number of gates in each of said groups of gates, each of said energizing means being connected to a different one of said gates in each of said groups of gates,
    means for sequentially operating said energizing means in accordance with the shift magnitude registered in said second registering means,
    a plurality of signal means each connected to predetermined ones of said gates together with said energizing means for controlling the operations of said gates,
    means for controlling the operations of said signal means in accordance with the values of bits contained in respective stages of said register, in accordance with the type of order registered in said first registering means, and in accordance with the direction of shift registered in said third registering means, and
    means responsive to the type of order registered in said first registering means and connected to said register stages for enabling bits to be written by said groups of gates only in selected stages of said register.

7. A shifting control circuit for a multistage register in accordance with claim 6 wherein said means for sequentially operating said energizing means in accordance with the shift magnitude registered in said second registering means comprises
   a clock pulser,
   a plurality of pulsing means sequentially operated by said clock pulser,
   a plurality of means each responsive to particular shift magnitudes being registered in said second registering means for inhibiting the operation of a respective one of said pulsing means, and
   a plurality of groups of means, each means in each group for operating a different one of said energizing means, each of said plurality of groups of means being controlled by a respective one of said pulsing means and in accordance with the shift magnitude registered in said second registering means.

8. A shifting control circuit for a multistage register in accordance with claim 6
   wherein the types of orders registrable in said first registering means include shift, rotate and abbreviated rotate orders; and said enabling means is responsive to shift and rotate orders being registered in said first registering means for enabling bits to be written in all of said register stages, and is responsive to an abbreviated rotate order being registered in said first registering means for enabling bits to be written in preselected fewer than all of said register stages; and further including
   means responsive to a shift order being registered in said first registering means and to a first shift direction being registered in said third registering means to operate said gates to control the writing of a predetermined bit value in the stages at one end of said register, and
   means responsive to a shift order being registered in said first registering means and to the second shift direction being registered in said third registering means to operate said gates to control the writing of said predetermined bit value in the stages at the other end of said register.

9. A logic circuit for controlling the shifting of bits within the stages of a register comprising
   first means for indicating a direction of shift,
   second means for indicating the magnitude of the shift,
   third means for indicating whether the bits in said register are to be rotated within said register or shifted out of one of the ends of said register,
   a plurality of gating path means connected to each stage of said register for transferring the bit in said each stage to selected other stages of said register, each of said selected other stages being one of a predetermined number of positions away from said stage in both directions, said gating path means transferring the bits in the stages at each end of said register to selected stages at the other end of said register,
   a plurality of means, equal in number to one-half the number of gating path means connected to said each stage, each together with said first indicating means for operating all of the gating path means which transfer the bits in respective stages the same number of positions away from said respective stages in the same direction, said direction being determined by the direction registered in said first indicating means,
   means for sequentially energizing said operating means in accordance with the shift magnitude registered in said second indicating means, and
   means responsive to said third indicating means when the bits in said register are to be shifted out of one of the ends of said register for controlling said gating path means to write a bit having a predetermined value into the stages at the other end of said register.

10. A circuit for executing shift, rotate and abbreviated rotate orders, to both the left and the right, on the bits contained in the stages of a register comprising
    first order indicating means operative only when a shift order is to be executed,
    second order indicating means operative only when an abbreviated rotate order is to be executed, with neither of said first and second order indicating means being operative when a rotate order is to be executed,
    first registering means for registering the direction of shift on any order,
    second registering means for registering the magnitude of the shift required in executing any order,
    a plurality of pulsing means sequentially energizable in accordance with the shift magnitude registered in said second registering means,
    a plurality of means controlled by said first and second order indicating means and by said first registering means for deriving destination signals representative of the bit values contained in respective stages of said register when predetermined types of orders in predetermined directions are to be executed,
    means responsive to said pulsing means, said destination signal deriving means, said first order indicating means and said first registering means for applying signals to write bits into said register stages, and
    means responsive to said second order indicating means for enabling bits to be written by said signal applying means in all of said register stages when a shift or rotate order is to be executed, and for enabling bits to be written by said signal applying means in fewer than all of said register stages when an abbreviated rotate order is to be executed.

11. A circuit for executing shift, rotate, and abbreviated rotate orders, to both the left and the right, on the bits contained in the stages of a register in accordance with claim 10 wherein said signal applying means includes a plurality of groups of gating means, each said group of gating means including a number of said gating means equal to the number of said pulsing means, said gating means in each said group for applying signals to write a bit into a respective one of said register stages associated with said each group of gating means, each of said gating means in each of said groups being controlled by a different one of said pulsing means and by respective ones of said destination signal deriving means, some of said gating means being additionally controlled by said first order indicating means and said first registering means.

12. A circuit for executing shift, rotate and abbreviated rotate orders, to both the left and the right, on the bits contained in the stages of a register in accordance with claim 10 wherein said plurality of means for deriving destination signals includes
    a first group of gating means each controlled by said first registering means to derive a destination signal representative of the bit value contained in a respective stage of said register when the direction of shift registered is a predetermined direction, and
    a second group of gating means each controlled by said first and second order indicating means and said first registering means to derive a destination signal representative of the bit value contained in a respective stage of said register when the direction of shift registered is a predetermined direction and a shift or rotate order is to be executed, and representative of the bit value contained in another respective stage of said register when the direction of shift registered is said predetermined direction and an abbreviated rotate order is to be executed.

13. A logic circuit for controlling the shifting of bits within the stages of a register comprising
    first register means for registering a direction of shift,
    second register means for registering the magnitude of the shift, third register means for registering an order which specifies whether the bits in all of said register stages are to be rotated within said entire register, the bits in preselected fewer stages of said register are to be rotated within said preselected fewer stages, or the bits in the stages at one of the ends of said register are to be shifted out of said one end of said register, a plurality of first gating path means connected to each stage of said register for transferring the bit in said each stage to selected other stages of said register, each of said selected other stages being one of a predetermined number of positions away from said each stage in both directions, said first gating path means including gating path means for transferring the bits in the stages at each end of said register to selected stages at the other end of said register, a plurality of second gating path means connected to each of said preselected fewer stages for transferring the bit in said each one of said preselected stages to picked other stages of said preselected fewer stages, each of said picked other stages being one of said predetermined number of positions away from said one of said preselected fewer stages in both directions, said second gating path means including gating path means for transferring the bits in the stages at each end of said preselected fewer stages to stages at the other end of said preselected fewer stages, a plurality of first operating means equal in number to one-half the number of said first gating path means connected to said each stage, each said first operating means responsive to said third registering means having registered therein an order to rotate the bits in all of said register stages within said entire register and to said first registering means for operating all of said first gating path means which transfer the bits in respective stages to stages the same number of positions away from said respective stages in the same direction, said direction being determined by the direction registered in said first registering means, a plurality of second operating means equal in number to one-half the number of said second gating path means connected to said each one of said preselected fewer stages, each said second operating means responsive to said third registering means having registered therein an order to rotate only the bits in said preselected fewer stages within said preselected fewer stages and to said first registering means for operating all of said second gating path means which transfer the bits in respective stages to stages the same number of positions away from said respective stages in the same direction, said direction being determined by the direction registered in said first registering means, means for sequentially energizing said first operating means in accordance with the shift magnitude registered in said second registering means when said third registering means has registered therein either an order to rotate the bits in all of said register stages within said entire register, or an order to shift the bits in the stages at one end of said register out of said register, means for sequentially energizing said second operating means in accordance with the shift magnitude registered in said second registering means when said third registering means has registered therein an order to rotate only the bits in said preselected fewer stages within said preselected stages, and means responsive to said third registering means having registered therein an order to shift the bits in the stages at one end of said register out of said register for controlling said first gating path means to write a bit having a predetermined value into the stages at the other end of said register.

14. A circuit for executing shift, rotate and abbreviated rotate orders, to both the left and the right, on the bits contained in the stages of a register comprising first instruction means operative only when a shift order to the left is to be executed,
second instruction means operative only when a shift order to the right is to be executed,
third instruction means operative only when an abbreviated rotate order is to be executed,
fourth instruction means operative only when an order to be executed is to the left,
fifth instruction means operative only when an order to be executed is to the right,
sixth instruction means for registering the magnitude of the shift required in executing any order,
a plurality of pulsing means sequentially energizable in accordance with the shift magnitude registered in said sixth instruction means,
a plurality of gating means for deriving destination signals, a first group of said gating means being responsive to said fourth instruction means for deriving destination signals representing the values of the bits contained in respective stages of said register when the order to be executed is to the left, a second group of said gating means being responsive to said fifth instruction means for deriving destination signals representing the values of the bits contained in respective stages of said register when the order to be executed is to the right, a third group of said gating means being responsive to said third and fourth instruction means for deriving destination signals representing the values of the bits contained in respective stages of said register when the order to be executed is a shift or rotate order to the left and for deriving destination signals representing the values of the bits contained in other respective stages of said register when the order to be executed is an abbreviated rotate order to the left, and a fourth group of said gating means being responsive to said third and fifth instruction means for deriving destination signals representing the values of the bits contained in respective stages of said register when the order to be executed is a shift or rotate order to the right and for deriving destination signals representing the values of the bits contained in other respective stages of said register when the order to be executed is an abbreviated rotate order to the right,
a plurality of groups of write means, each group of write means including a number of said write means equal to the number of said pulsing means, said write means of each group for applying signals to write a bit into a respective one of said register stages associated with said each group of write means, write each means in each group of write means being controlled by a different one of said pulsing means, by one of said gating means in one of said first and third groups of gating means and by one of said gating means in one of said second and fourth groups of gating means, some of said write means being additionally controlled by said first and second instruction means, and
means responsive to said third instruction means for enabling bits to be written by said write means in all of said register stages when a shift or rotate order is to be executed, and for enabling bits to be written by said write means in fewer than all of said register stages when an abbreviated rotate order is to be executed.

15. A circuit for shifting the bits contained in the stages of a register comprising a plurality of means each connected to a respective one of said stages for transferring the bit in said respective stage to an adjacent stage; characterized in that said circuit comprises additional pluralities of means, the means in each of said additional pluralities each being connected to a respective one of said stages for transferring the bit in said respective stage to another stage separated from said respective stage by a number of positions unique to said each additional plurality, and means for controlling the selective and sequential operations of said plurality of transferring means and said additional pluralities of transferring means for transferring the bits in said stages such that the bits originally in said register are shifted a selected number of positions in a number of transferring operations smaller than said selected number of positions.

References Cited

UNITED STATES PATENTS

| | | | |
|---|---|---|---|
| 2,652,501 | 9/1953 | Wilson | 340—174 |
| 2,700,502 | 1/1955 | Hamilton et al. | 328—37 |
| 2,785,390 | 3/1957 | Rajchman | 340—174 |
| 2,991,456 | 7/1961 | Evans | 340—172.5 |
| 2,998,192 | 8/1961 | Florida | 235—92.68 |
| 3,026,500 | 3/1962 | May et al. | 340—172.5 |
| 3,076,181 | 1/1963 | Newhouse et al. | 340—172.5 |
| 3,103,580 | 9/1963 | Foreman | 328—37 |
| 3,210,737 | 10/1965 | Perry et al. | 340—172.5 |
| 3,239,764 | 3/1966 | Verma et al. | 328—37 |
| 3,274,556 | 9/1966 | Paul et al. | 340—172.5 |

ROBERT C. BAILEY, *Primary Examiner.*

J. P. VANDENBURG, *Assistant Examiner.*

Disclaimer 3,350,692.—*William B. Cagle*, Colts Neck, and *Robert S. Menne*, Little Silver, N.J. FAST REGISTER CONTROL CIRCUIT. Patent dated Oct. 31, 1967. Disclaimer filed Oct. 21, 1968, by the assignee, *Bell Telephone Laboratories, Incorporated*.

Hereby enters this disclaimer to claims 1 through 4 and 15 of said patent.
[*Official Gazette March 18, 1969.*]